(12) United States Patent
Shigenobu et al.

(10) Patent No.: US 9,185,251 B2
(45) Date of Patent: Nov. 10, 2015

(54) METHOD AND DEVICE FOR DISPLAYING AND SELECTING FUNCTIONS AND ASSOCIATED CONDITIONS USING A SET OF HARD KEYS

(75) Inventors: Dai Shigenobu, Osaka (JP); Nobuyasu Mori, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 877 days.

(21) Appl. No.: 13/435,059

(22) Filed: Mar. 30, 2012

(65) Prior Publication Data

US 2012/0250060 A1    Oct. 4, 2012

(30) Foreign Application Priority Data

Mar. 30, 2011  (JP) .................................. 2011-075422

(51) Int. Cl.
*G06F 3/048* (2013.01)
*H04N 1/00* (2006.01)
(Continued)

(52) U.S. Cl.
CPC ......... *H04N 1/00424* (2013.01); *G03G 15/502* (2013.01); *G06F 3/04886* (2013.01); *H04N 1/00387* (2013.01); *H04N 1/00474* (2013.01); *H04N 1/00482* (2013.01); *H04N 1/00496* (2013.01); *H04N 2201/0094* (2013.01)

(58) Field of Classification Search
CPC .......... H04N 1/00482; H04N 1/00474; H04N 2201/0094; H04N 1/00389; H04N 1/00408; H04N 1/00413; H04N 1/00503; H04N 1/00384; H04N 1/00435; G03G 15/5016
USPC ........................................................ 715/810
See application file for complete search history.

(56) References Cited

U.S. PATENT DOCUMENTS 6,285,842 B1 * 9/2001 Katamoto et al. ............. 399/81
7,170,429 B2 * 1/2007 Koppich .......................... 341/23
8,107,844 B2 * 1/2012 Harigae ......................... 399/81
(Continued)

FOREIGN PATENT DOCUMENTS

JP    6-70071 A    3/1994
JP    2002-314788 A    10/2002
JP    2009-229972 A    10/2009

OTHER PUBLICATIONS

Notice of Reasons for Rejection issued to JP Application No. 2011-075422 mailed Jul. 3, 2013.

*Primary Examiner* — Jennifer To
*Assistant Examiner* — Joseph R Burwell
(74) *Attorney, Agent, or Firm* — Knobbe Martens Olson & Bear LLP

(57) ABSTRACT

An operation device according to the present disclosure includes a number of hard keys, a function icon display unit, a condition icon display unit, a function item receiving unit, a function item change unit, a condition item receiving unit, and a setting condition receiving unit. The function icon display unit can display a number of function icons indicating the function item respectively assigned to the number of hard keys. The condition icon display unit can display a condition icon indicating a condition item. The function item change unit changes an assignment to the hard keys from the function item to the condition item. The condition item receiving unit displays a condition icon corresponding to the condition item assigned to the hard key. The setting condition receiving unit receives a setting condition indicated by the condition item corresponding to the hard key for which the selection was received.

13 Claims, 12 Drawing Sheets

(51) Int. Cl.
*G06F 3/0488* (2013.01)
*G03G 15/00* (2006.01)

(56) References Cited

U.S. PATENT DOCUMENTS

| | | | | |
|---|---|---|---|---|
| 8,494,393 B2* | 7/2013 | Kobayashi | | 399/81 |
| 8,514,414 B2* | 8/2013 | Tashiro et al. | | 358/1.13 |
| 2002/0015598 A1* | 2/2002 | Maeda et al. | | 399/81 |
| 2002/0063691 A1* | 5/2002 | Rogers et al. | | 345/168 |
| 2003/0020760 A1* | 1/2003 | Takatsu et al. | | 345/810 |
| 2003/0189551 A1* | 10/2003 | Olsen | | 345/168 |
| 2004/0052543 A1* | 3/2004 | Kato | | 399/81 |
| 2005/0046890 A1* | 3/2005 | Shudo | | 358/1.14 |
| 2006/0187483 A1* | 8/2006 | Baba | | 358/1.15 |
| 2007/0168654 A1* | 7/2007 | Kotani | | 713/150 |
| 2007/0242316 A1* | 10/2007 | Matsushita | | 358/474 |
| 2008/0199199 A1* | 8/2008 | Kato et al. | | 399/81 |
| 2009/0251417 A1* | 10/2009 | Pate et al. | | 345/168 |
| 2009/0315904 A1* | 12/2009 | Sugimoto et al. | | 345/531 |
| 2011/0030050 A1* | 2/2011 | Fukushima et al. | | 726/16 |
| 2011/0128575 A1* | 6/2011 | Iwata | | 358/1.15 |
| 2011/0279842 A1* | 11/2011 | Abe et al. | | 358/1.13 |

* cited by examiner

| HARD KEY ID | FUNCTION ITEM |
|---|---|
| K01 | Copy |
| K02 | Scan |
| K03 | Print Box |
| K04 | ID Copy |
| K05 | Fax |

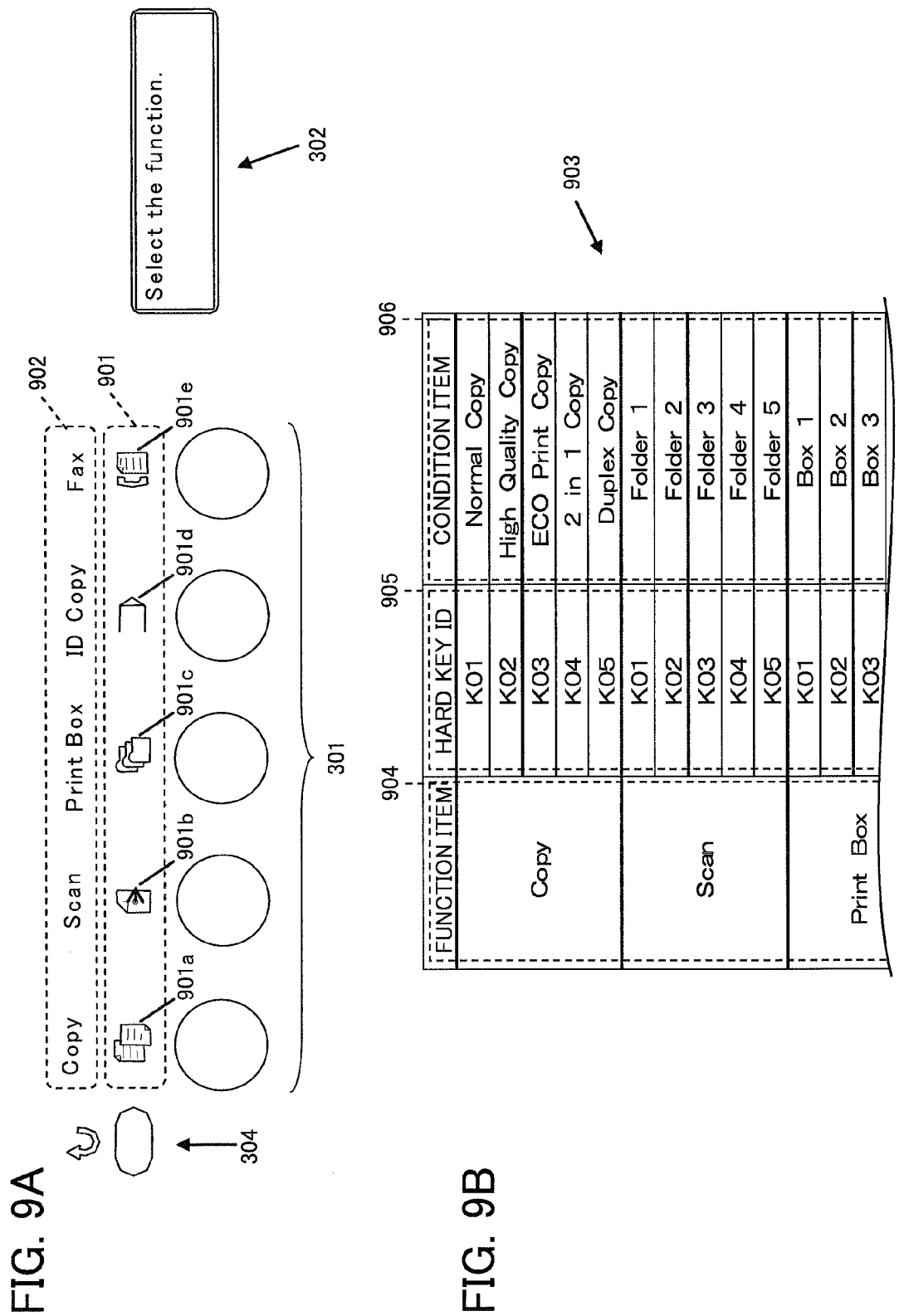

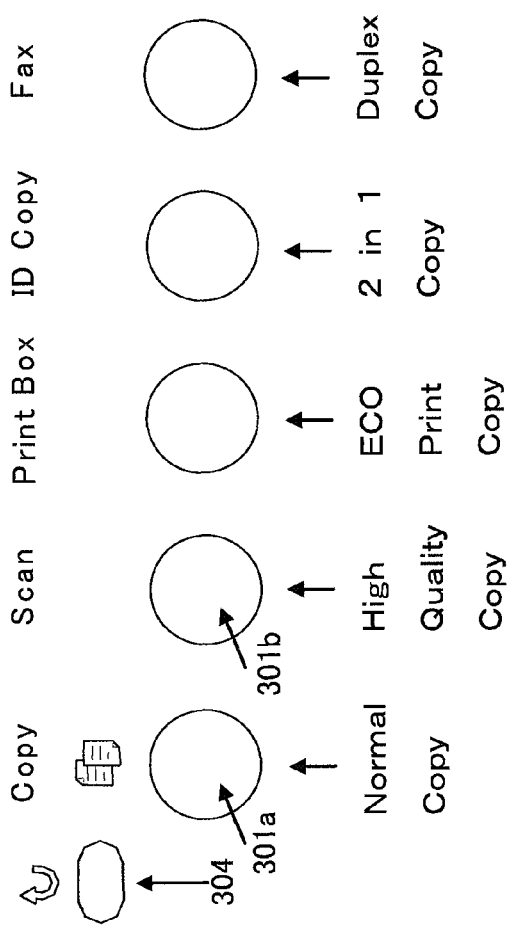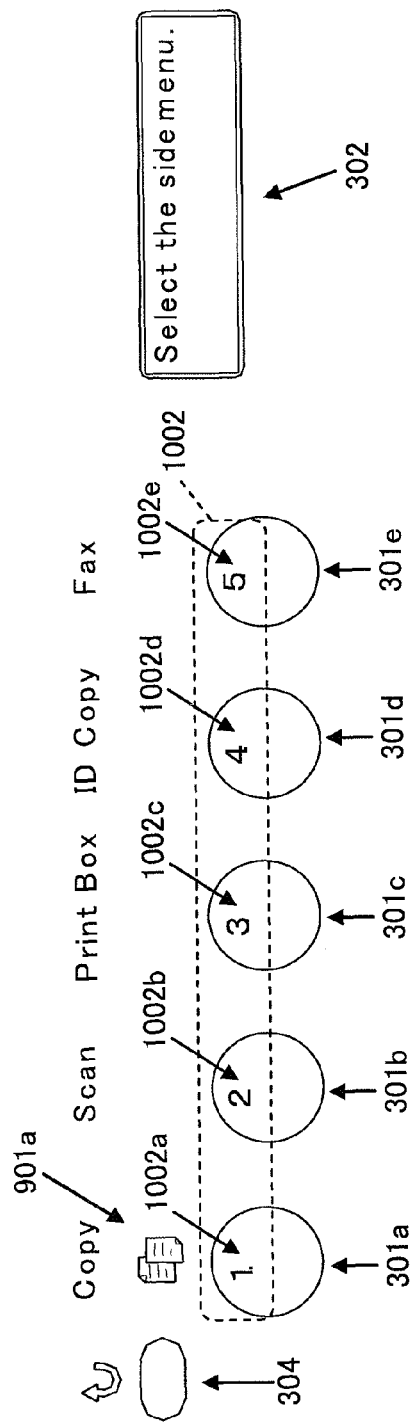
FIG. 10A
FIG. 10B

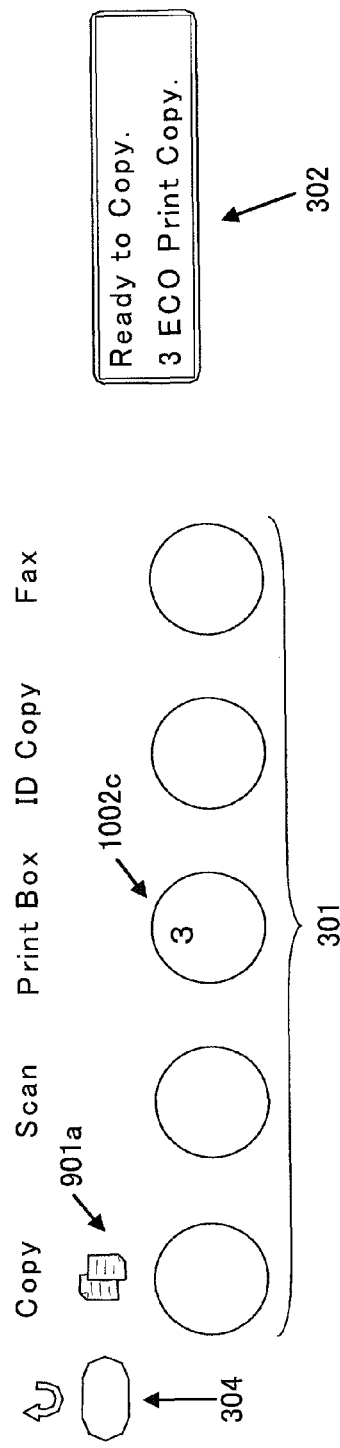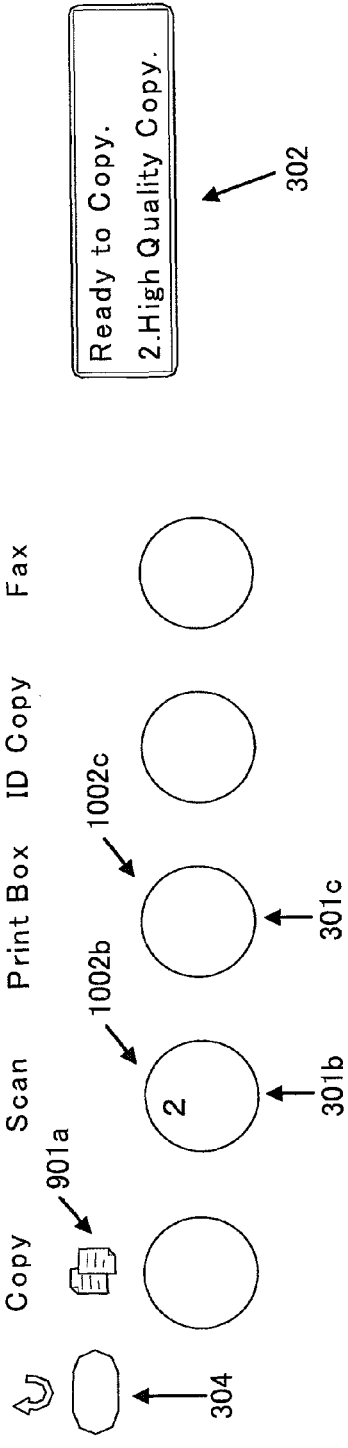

METHOD AND DEVICE FOR DISPLAYING AND SELECTING FUNCTIONS AND ASSOCIATED CONDITIONS USING A SET OF HARD KEYS

This application is based on and claims the benefit of priority from Japanese Patent Application No. 2011-075422, filed on 30 Mar. 2011, the content of which is incorporated herein by reference.

BACKGROUND

The present invention relates to an operation device and an operation method.

In image forming apparatuses, including duplicating machines, printers, facsimile machines, or a multifunction machine (multifunction peripheral) of these, there has been development into multifunctionalization in order to satisfy a variety of needs of users. Furthermore, accompanying this multifunctionalization, the number of functional items in image forming apparatuses has also increased continuously.

In this regard, in order for a user to use a plurality of functions of an image forming apparatus of a type using soft keys, it is necessary to configure the soft key corresponding to a functional item indicating an available function to be displayable on an operation panel (touch screen).

However, expansion of the space for the display screen of an operation panel equipped to the image forming apparatus has not been secured sufficiently due to the development into multifunctionalization. As a result, an image forming apparatus has thus far been known that, in order to effectively utilize the limited space of the operation panel, has a configuration in which only functional items for representative functions are listed in an indexed manner, and functional items for other functions are classified over several levels into lower layers of the functional items for the representative functions.

In the abovementioned technology, if a functional item related to a request by a user is allocated to a deep layer such as the fifth lower layer of the layered structure, it would be necessary to selectively operate in a sequence through the layers of the multi-layered structure until reaching the functional item. As a result, the manipulations for such operations may be troublesome for the user.

To address this, an image forming apparatus has been disclosed that includes a plurality of function setting keys that is operated when setting various functions for image forming; a shortcut key that is operated when directly setting a function related to combination of one, two or more functions registered in advance; and a display unit that displays setting information of a key for a function setting including the shortcut key (Related Art 1:Japanese Unexamined Patent Application Publication 2009-229972). This image forming apparatus includes a function registration unit in which setting information for realizing a function related to a combination of at least two functions is registered to be associated with the shortcut key; and a difference extraction unit that, when the shortcut key is operated, extracts the difference between setting information for the shortcut key read from the function registration unit and setting information for default. The image forming apparatus further includes a display control unit that performs control to display, as a list on the display unit, all of the setting information relating to the difference extracted at the difference extraction unit.

In the image forming apparatus of Related Art 1, all of the contents of setting changes from the default for the shortcut key are listed and displayed on the display unit. As a result, it becomes possible for the user to know the details of the setting changes from the default by glancing the list display screen on the display unit. Therefore, the image forming apparatus of Related Art 1 can utilize limited shortcut key resources as well as maintain utilization efficiency at a high level as an apparatus overall by remarkably improving the usability of the shortcut.

However, in the technology disclosed in Related Art 1, there may be a case in which, it is necessary for the user to input (register) the setting conditions (setting information) corresponding to the shortcut key in advance through the operation panel, and thus the initial setting operation may be troublesome.

Furthermore, the function of the abovementioned shortcut key or a program function that associates only a specific setting condition with a specific key in advance have superior convenience when reproducing a specific setting condition. However, in a case of inputting setting conditions differing from the specific setting conditions, it is not possible for the user to use the function of the shortcut key or the program key, and the user must input the desired setting conditions from the beginning through the operation panel.

However, in the image forming apparatus, the functions frequently used by the user are usually limited to a predetermined number such as the copy function and scan function. Therefore, an operation device (image forming apparatus) has been demanded that allows the setting conditions of such a limited predetermined number of functions to be input simply and quickly. The image forming apparatus providing aforementioned operation panel requires key operations to be made several times in order to input the setting conditions of a specific function, whereby it is not possible to simply and quickly input predetermined setting conditions. Furthermore, the image forming apparatus having the aforementioned operation panel is configured so that the screen on the panel changes with every key operation, and the keys of lower layers are displayed. As a result, in a case of the setting conditions of a specific function being on a lower layer, it may be difficult for the user to remember on which of the lower layers the setting conditions of the specific function exists, and the key operations themselves may be difficult to remember.

SUMMARY

An operation device according to the present disclosure includes a predetermined number of hard keys, a function icon display unit, a condition icon display unit, a function item receiving unit, a function item change unit, a condition item receiving unit, and a setting condition receiving unit.

A function item indicating a predetermined function is respectively assigned to the predetermined number of hard keys.

The function icon display unit can display a predetermined number of function icons indicating the function item respectively assigned to the predetermined number of hard keys, in the proximity of each of the predetermined number of hard keys.

The condition icon display unit can display a condition icon indicating a condition item respectively assigned to the predetermined number of hard keys, at or in the proximity of each of the predetermined number of hard keys.

The function item receiving unit displays all or a portion of the predetermined number of function icons on the function icon display unit, and receives a selection of a predetermined hard key.

The function item change unit changes an assignment to all or a portion of the predetermined number of hard keys from the function item to the condition item indicating a setting condition of the function item assigned to the hard key for which a selection is received, respectively, when the selection of the predetermined hard key is received by the function item receiving unit.

The condition item receiving unit displays a condition icon corresponding to the condition item assigned to the hard key on the condition icon display unit and receives a selection of a predetermined hard key, when an assignment to all or a portion of the predetermined number of hard keys is changed from the function item to the condition item by the function item change unit.

The setting condition receiving unit receives a setting condition indicated by the condition item corresponding to the hard key for which the selection was received, when a selection of a predetermined hard key on which a condition item corresponding thereto is displayed is received by the condition item receiving unit.

An image forming apparatus according to the present disclosure has an operation device.

The operation device includes a predetermined number of hard keys, a function icon display unit, a condition icon display unit, a function item receiving unit, a function item change unit, a condition item receiving unit, and a setting condition receiving unit.

A function item indicating a predetermined function is respectively assigned to the predetermined number of hard keys.

The function icon display unit can display a predetermined number of function icons indicating the function item respectively assigned to the predetermined number of hard keys, in the proximity of each of the predetermined number of hard keys.

The condition icon display unit can display a condition icon indicating a condition item respectively assigned to the predetermined number of hard keys, at or in the proximity of each of the predetermined number of hard keys.

The function item receiving unit displays all or a portion of the predetermined number of function icons on the function icon display unit, and receives a selection of a predetermined hard key.

The function item change unit changes an assignment to all or a portion of the predetermined number of hard keys from the function item to the condition item indicating a setting condition of the function item assigned to the hard key for which a selection is received, respectively, when the selection of the predetermined hard key is received by the function item receiving unit.

The condition item receiving unit displays a condition icon corresponding to the condition item assigned to the hard key on the condition icon display unit and receives a selection of a predetermined hard key, when an assignment to all or a portion of the predetermined number of hard keys is changed from the function item to the condition item by the function item change unit.

The setting condition receiving unit receives a setting condition indicated by the condition item corresponding to the hard key for which the selection was received, when a selection of a predetermined hard key on which a condition item corresponding thereto is displayed is received by the condition item receiving unit.

In an operation method of a operation device, the operation device includes:

a predetermined number of hard keys to which a function item indicating a predetermined function is respectively assigned;

a function icon display unit that can display a predetermined number of function icons indicating the function item respectively assigned to the predetermined number of hard keys, in the proximity of each of the predetermined number of hard keys;

a condition icon display unit that can display a condition icon indicating a condition item respectively assigned to the predetermined number of hard keys, at or in the proximity of each of the predetermined number of hard keys.

The method includes a function item receiving step, a function item change step, a condition item receiving step, and a setting condition receiving step.

In a function item receiving step, the operation device displays all or a portion of the predetermined number of function icons on the function icon display unit, and receives a selection of a predetermined hard key.

In a function item change step, the operation device changes an assignment to all or a portion of the predetermined number of hard keys from the function item to the condition item indicating a setting condition of the function item assigned to the hard key for which a selection is received, respectively, when the selection of the predetermined hard key is received by the function item receiving unit.

In a condition item receiving step, the operation device displays a condition icon corresponding to the condition item assigned to the hard key on the condition icon display unit and receives a selection of a predetermined hard key, when an assignment to all or a portion of the predetermined number of hard keys is changed from the function item to the condition item by the function item change unit.

In a setting condition receiving step, the operation device receives a setting condition indicated by the condition item corresponding to the hard key for which the selection was received, when a selection of a predetermined hard key on which a condition item corresponding thereto is displayed is received by the condition item receiving unit.

BRIEF DESCRIPTION OF THE DRAWINGS

FIG. 9A is a first diagram showing an example of an operation unit according to an embodiment of the present disclosure;

FIG. 9B is a diagram showing an example of a conditional item table of an embodiment of the present disclosure;

FIG. 10A is a diagram showing a relationship between hard keys and conditional items according to an embodiment of the present disclosure;

FIG. 10B is a second diagram showing an example of an operation unit according to an embodiment of the present disclosure;

FIG. 11A is a third diagram showing an example of an operation unit according to an embodiment of the present disclosure;

FIG. 11B is a fourth diagram showing an example of an operation unit according to an embodiment of the present disclosure.

DETAILED DESCRIPTION

An embodiment of an image forming apparatus including an operation device of the present disclosure is described hereinafter with reference to the drawings to allow understanding of the present disclosure. It should be noted that the following embodiments are examples for embodying the present disclosure and do not limit the technical scope of the present disclosure. In addition, the letter "S" attached before a numeral in the flow charts denotes a step. Image Forming Apparatus and Operation Device In the following, an image forming apparatus (for example, a multifunction machine) including an operation device (for example, an operation unit) according to the present disclosure is explained.

Figure 1:
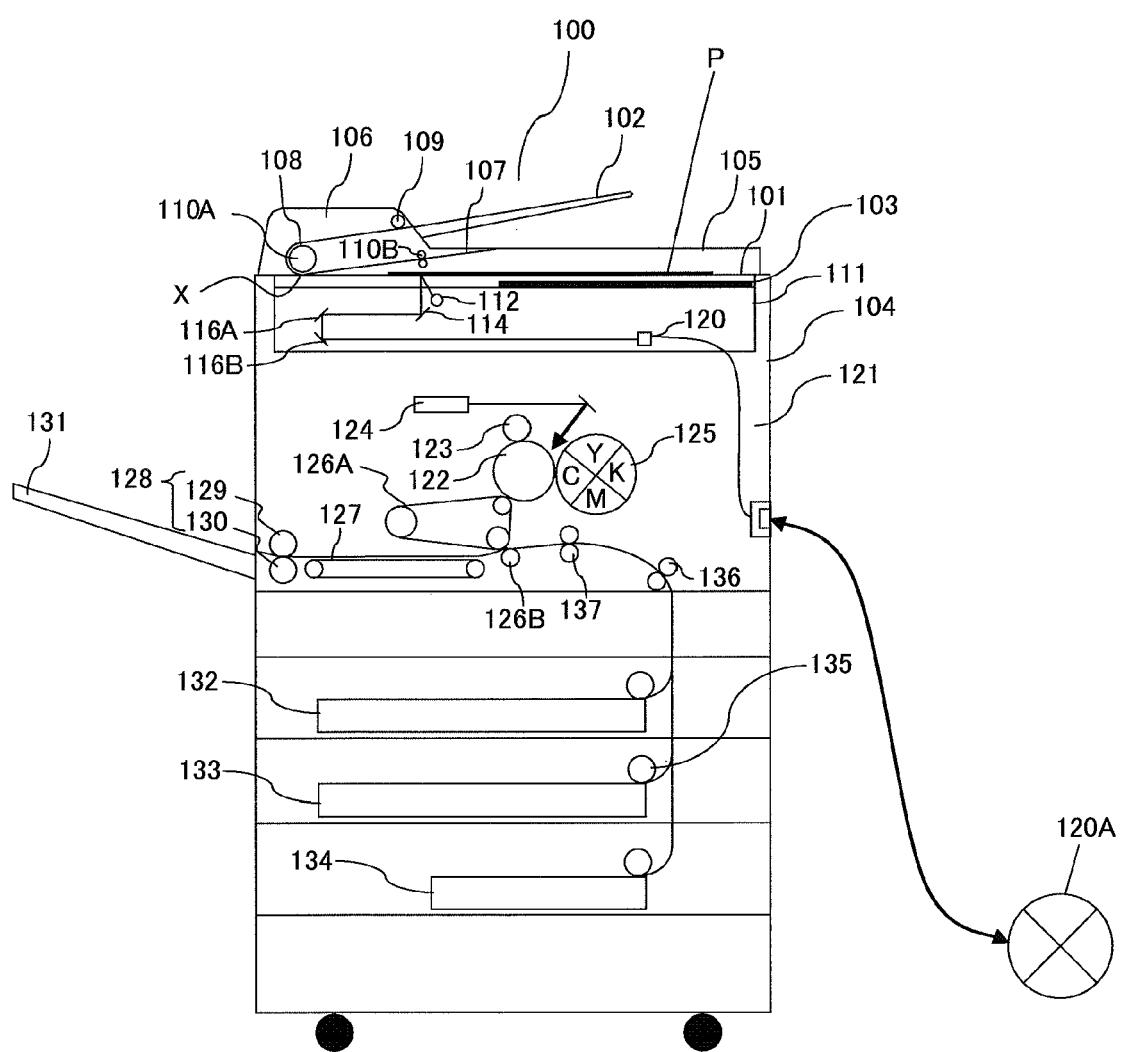
FIG. 1 is conceptual diagram showing an overall configuration inside of a multifunction machine according to an embodiment of the present disclosure.

FIG. 1 is a conceptual view showing an overall configuration inside of a multifunction machine according to the present disclosure. However, the details of each unit that is not related to the present disclosure directly are omitted.

A multifunction machine 100 of the present disclosure corresponds to an independent printer device, an independent scanner device, or a multifunction machine including a printer device, a copier device, a scanner device, a facsimile device, and the like. In addition, operation of the multifunction machine 100 when providing a copy function for a document using a multi-function machine is explained as an example.

When a user tries to print a document P, for example, using the multifunction machine 100, the user places the document P on a platen 101 or a document feeder tray 102 shown in FIG. 1. Then, the user inputs copy conditions to an operation unit 103 disposed in the proximity of the platen 101, and instructs the machine to print a document. The configuration of the operation unit 103 will be described later. With such an instruction to print a document, the multifunction machine operates each unit (drive unit) shown below to print a document.

As shown in FIG. 1, the multifunction machine 100 of the present disclosure includes a main body 104 and a platen cover 105 attached above the main body 104. The platen 101 is provided on a top surface of the main body 104. The platen 101 is configured to be opened and closed by the platen cover 105. The platen cover 105 is provided with an automatic document feeder device 106, the document feeder tray 102, and a document discharge tray 107.

The automatic document feeder device 106 is configured with a document conveying path 108 formed inside of the platen cover 105, a pickup roller 109 disposed inside of the platen cover 105, conveying rollers 110A, 110B, and the like.

The document conveying path 108 is a conveying path of a document leading from the document feeder tray 102 to the document discharge tray 107 via a read position X where the document is read by way of an image reading unit 111 provided at the main body 104.

The automatic document feeder device 106 draws in each document from among a plurality of the documents placed on the document feeder tray 102 one-by-one into the document conveying path 108 by way of the pickup roller 109, passes the document drawn out by a conveying roller and the like through the read position X, and discharges the document to the document discharge tray 107 by way of the conveying roller 110B. The document is read at the image reading unit 111 when it passes through the read position X.

Figure 2:
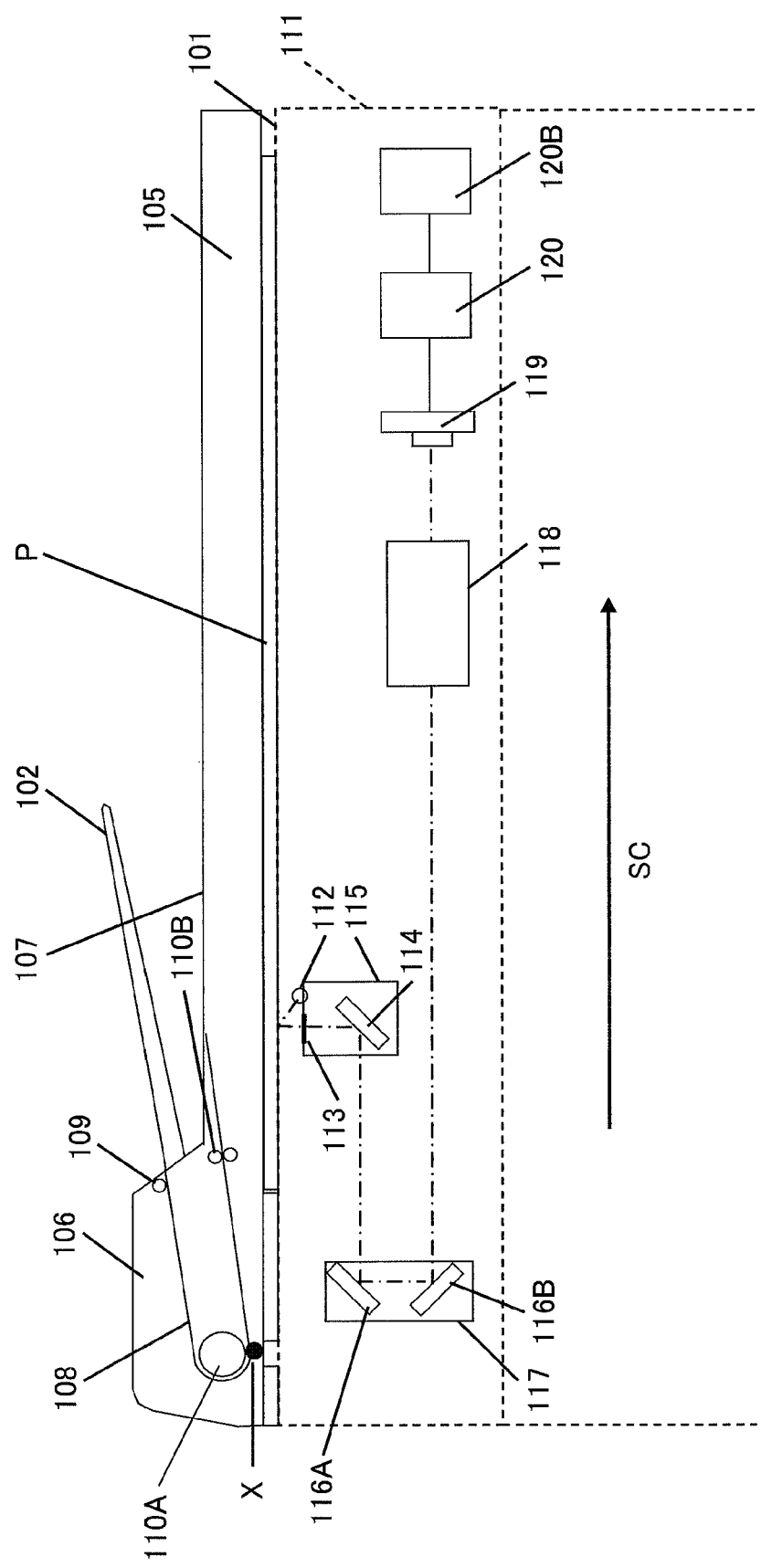
FIG. 2 is an enlarged view of an image reading unit according to an embodiment of the present disclosure.

The image reading unit 111 is provided below the platen 101, and is shown in FIG. 2 in detail. The image reading unit 111 is configured to include: a first moving carriage 115 having a light source 112 that is long in a scanning direction and irradiates the platen 101, a slit 113 that allows the light from the platen to pass through selectively, and a mirror 114 that guides the light from the platen; a second moving carriage 117 having mirrors 116A and 116B that reflect again reflected light from the first moving carriage 115; a group of lenses 118 that further optically corrects the light guided by the mirrors; an imaging element 119 that receives the light corrected by the group of the lenses 118; and an image data generating unit 120 that converts the light received by the imaging element 119 to an electric signal and performs processes such as correction, image quality control, and compression as necessary.

In a case of reading a document on the automatic document feeder device 106, the light source 112 moves to a position where the read position X can be irradiated and emits the light. The light from the light source 112 permeates the platen 101, reflects the document which passes through the read position X, and then is guided to the imaging element 119 by way of the slit 113, the mirrors 114, 116A, 116B, and the group of lenses 118. The imaging element 119 converts the light thus received to an electric signal and transmits to the image data generating unit 120. The light received at the imaging element 119 is inputted to the image data generating unit 120 as an analogue electric signal of R(red), G(green), and B(blue). The image data generating unit 120 performs an analog-digital conversion, i.e. digitalizes, the analogue electric signal. Furthermore, by setting the digital signal converted sequentially as unit data and performing processes such as correction, image quality control, and compression on this unit data, the image data generating unit 120 generates an image data composed of a plurality of unit data.

Furthermore, the image reading unit 111 can read not only the document conveyed by way of the automatic document feeder device 106, but also a document placed on the platen 101. In a case of reading the document placed on the platen 101, the first carriage 115 moves in a sub scanning direction SC while emitting light at the light source 112, and the second moving carriage 117 moves towards the imaging element 119 at half the speed of the first moving carriage 115 in order to make a length of a light path from the light source 112 to the imaging device 119 constant.

Similar to the case of a document conveyed to the automatic document feeder device 106, the imaging element 119 converts the light from the document placed on the platen 101 into an electric signal, based on the light guided by the mirrors 114, 116A, and 116B. The image data generating unit 120 generates image data (document data) based on this electric signal and has the data stored in a storage unit 120B.

The image data stored at the storage unit 120B becomes a target for printing by an image forming unit 121 (described later), or is transmitted via a network interface to a terminal (a personal computer) connected to the multifunction machine 100 and a network 120A such as LAN, or a terminal such as another multifunction machine, another duplicating machine, a printer, or a facsimile machine, by a communication unit (not illustrated). A transmitting function includes a fax function (facsimile transmitting function), an e-mail transmitting function, and the like, for example.

The image forming unit 121 is provided below the image reading unit 111 of the main body 104 and prints (outputs) image data stored in the storage unit 120B. Image data that the image forming unit 121 can print is data generated at the image data generating unit 120 as described above, or data received via a network interface from a terminal such as a personal computer connected to the network 120A.

An electrophotographic method is employed for the printing method performed by the image forming unit 121. The electrophotographic method is a method of: charging a photoconductive drum 122 uniformly with a charger 123; then irradiating the photoconductive drum 122 by a laser 124 to form a latent image on the photoconductive drum 122; fixing toner to the latent image at an image developing device 125 to form a visible image; and transferring the visible image to a transfer medium by way of a transfer roller.

In addition, in a multifunction machine ready for a full-color image, the image developing device (rotary image developing device) 125 is configured to be rotatable in a circumferential direction around a rotational axis that is arranged in a vertical direction with respect to a plane of the document in FIG. 1. An image developing unit in which toner of a corresponding color is stored is disposed at a position opposite to the photoconductive drum 122. With this arrangement, a latent image on the photoconductive drum 122 is developed by the toner stored in the image developing device 125 and transferred to an intermediate transfer belt 126A. In addition, the image developing device 125 includes four image developing units 125 (Y), (C), (M), and (K), each of which stores toner of Yellow (Y), Cyan (C), Magenta (M), and Black (K), respectively. A full-color image is formed on the intermediate transfer belt 126A by repeating the transfer to the intermediate transfer belt 126A for each color.

The transfer medium on which a visible image is printed, i.e. a sheet, is placed on a document supply tray such as document supply cassettes 132, 133, and 134.

When printing, the image forming unit 121 draws in a single transfer medium by way of the pickup roller 135 from any one of the document supply trays and conveys the transfer medium thus drawn in between the intermediate transfer belt 126A and the transfer roller 126B by way of a conveying roller 136 and a registration roller 137.

The image forming unit 121 transfers the visible image on the intermediate transfer belt 126A to the transfer medium conveyed between the intermediate transfer belt 126A and the transfer roller 126B and conveys the transfer medium to a fixing unit 128 (fixing device) by way of a conveying belt 127 in order to fix the visible image. The fixing unit 128 is configured to include a heating roller 129, which incorporates a heater, and a pressure roller 130, which is pressed against the heating roller 129 at a predetermined pressure. When the transfer medium passes between the heating roller 129 and the pressure roller 130, the visible image is fixed on the transfer medium by way of the heat and the pressure force to the transfer medium. The transfer medium on which the visible image is fixed is discharged to a discharge tray 131.

With the abovementioned procedure, the multifunction machine 100 provides the user with the process of the copy function.

Figure 3:
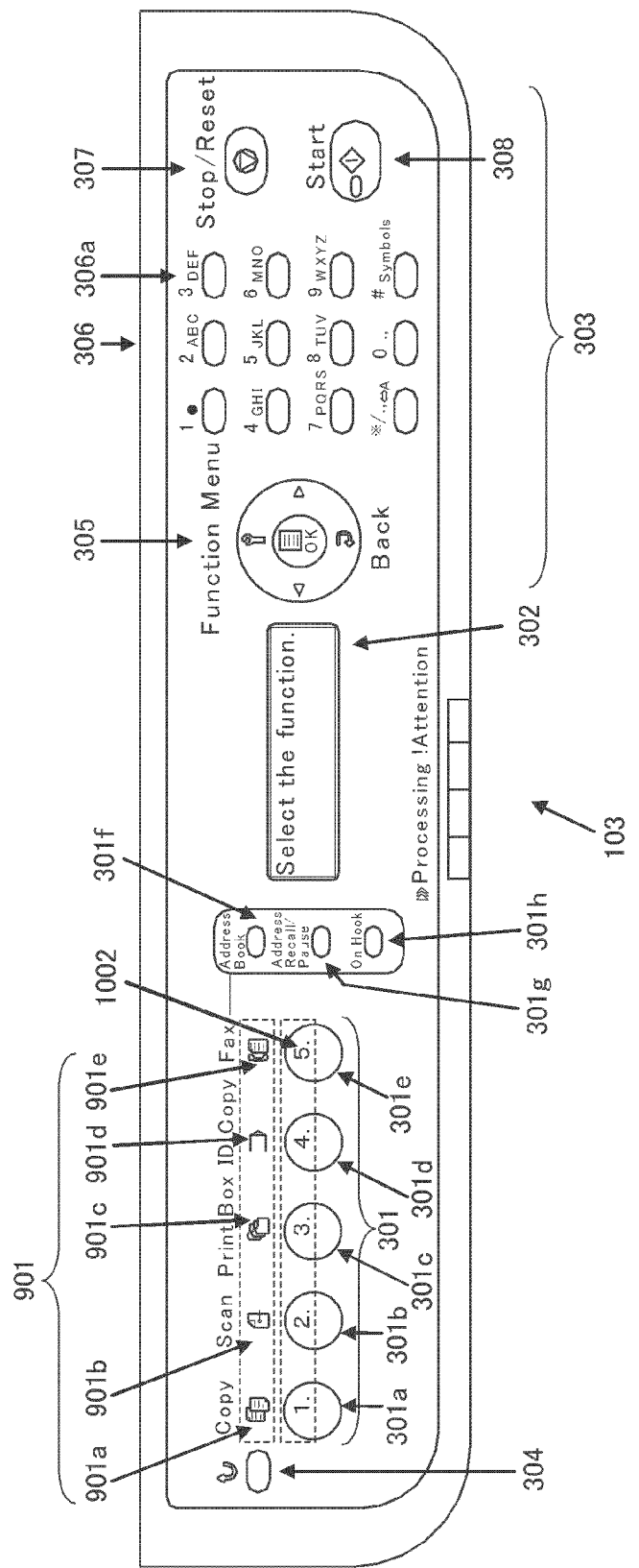
FIG. 3 is a conceptual diagram showing an overall configuration of an operation unit according to an embodiment of the present disclosure.

FIG. 3 is a conceptual diagram showing an overall configuration of an operation unit according to the present disclosure. The user uses the operation unit 103 to input setting conditions, etc., of a function for forming an image as described above, to confirm the setting conditions thus input, and the like.

The operation unit 103 includes a hard key group 301 consisting of a predetermined number of hard keys, a predetermined display panel 302, and a predetermined number of operation keys 303.

Furthermore, the operation unit 103 includes a function icon display unit 901 and a condition icon display unit 1002.

The function icon display unit 901 can display a predetermined number of function icons 901a to 901e indicating each functional item assigned to each of a predetermined number of hard keys 301a to 301e, respectively, in the proximity of each of the predetermined number of hard keys 301a to 301e. The function icon display unit 901 is formed in the proximity of each of the predetermined number of hard keys 301a to 301e and includes a predetermined number of function icons 901a to 901e indicating a function item assigned to each of the predetermined number of hard keys 301a to 301e, as described later. The function icon display unit 901 is disposed at an upper side (rear side) of the hard key group 301 (in FIG. 3) as seen from the user.

Furthermore, the condition icon display unit 1002 can display condition icons 1002a to 1002e that each display a condition item assigned to each of the predetermined number of hard keys 301a to 301e at the predetermined number of hard keys 301a to 301e themselves or in the proximity thereof. As described later, the condition icon display unit 1002 is formed on the predetermined number of hard keys 301a to 301e and includes condition item icons 1002a to 1002e for predetermined items indicating condition items assigned to each of the predetermined hard keys 301a to 301e in the present embodiment. The condition icon display unit 1002 is disposed on (within) the predetermined hard key group 301 (in FIG. 3) as seen from the user.

According to the above descriptions, a predetermined number of function items indicating a predetermined function provided to the multifunction machine 100 is respectively assigned to the predetermined number (five in the present embodiment) of hard keys 301a to 301e consisting of the hard key group 301. In a case of powering up the multifunction machine 100 or switching the multifunction machine 100 from a sleep mode to a normal mode, the function icons 901a to 901e indicating the predetermined function items assigned to each of the hard keys 301a to 301e configuring the hard key group 301 are displayed above and in the proximity of the hard key group 301.

When the user selects a specific hard key while the function icons are displayed, the content assigned to a specific hard key is changed from a function item to a condition item that indicates setting conditions of the function item of the specific hard key thus selected at the operation unit 103 (operation device). When the change of the condition item is complete, a condition icon indicating a predetermined condition item assigned to the hard key is displayed on (within) the hard key. Then, when the user further selects a specific hard key, the operation unit 103 (operation device) receives the setting conditions of the condition item assigned to the hard key (described later).

A return key 304 to cancel the selection of a function item or condition item is disposed on the left side in the proximity of hard key group 301. For example, a specific key provided with a program function, e.g., an Address Book key 301f, an Address Recall/Pause key 301g, and an On Hook key 301h, is disposed on the right side in the proximity of the hard key 301e, which is located rightmost among the hard key group 301 and to which a function item for a facsimile function is assigned, for example.

For example, a message or the like composed of one or two character strings is displayed on the display panel 302 as appropriate, depending on the selection of the hard key 301 or the operation keys 303.

The operation keys 303 includes arrow keys 305 consisting of a Function Menu key, a Back key, an up key, and a down key, a numerical keypad 306 through which numerals and characters can be entered, a Step/Reset key 307, and a Start key 308, for example.

Figure 4:
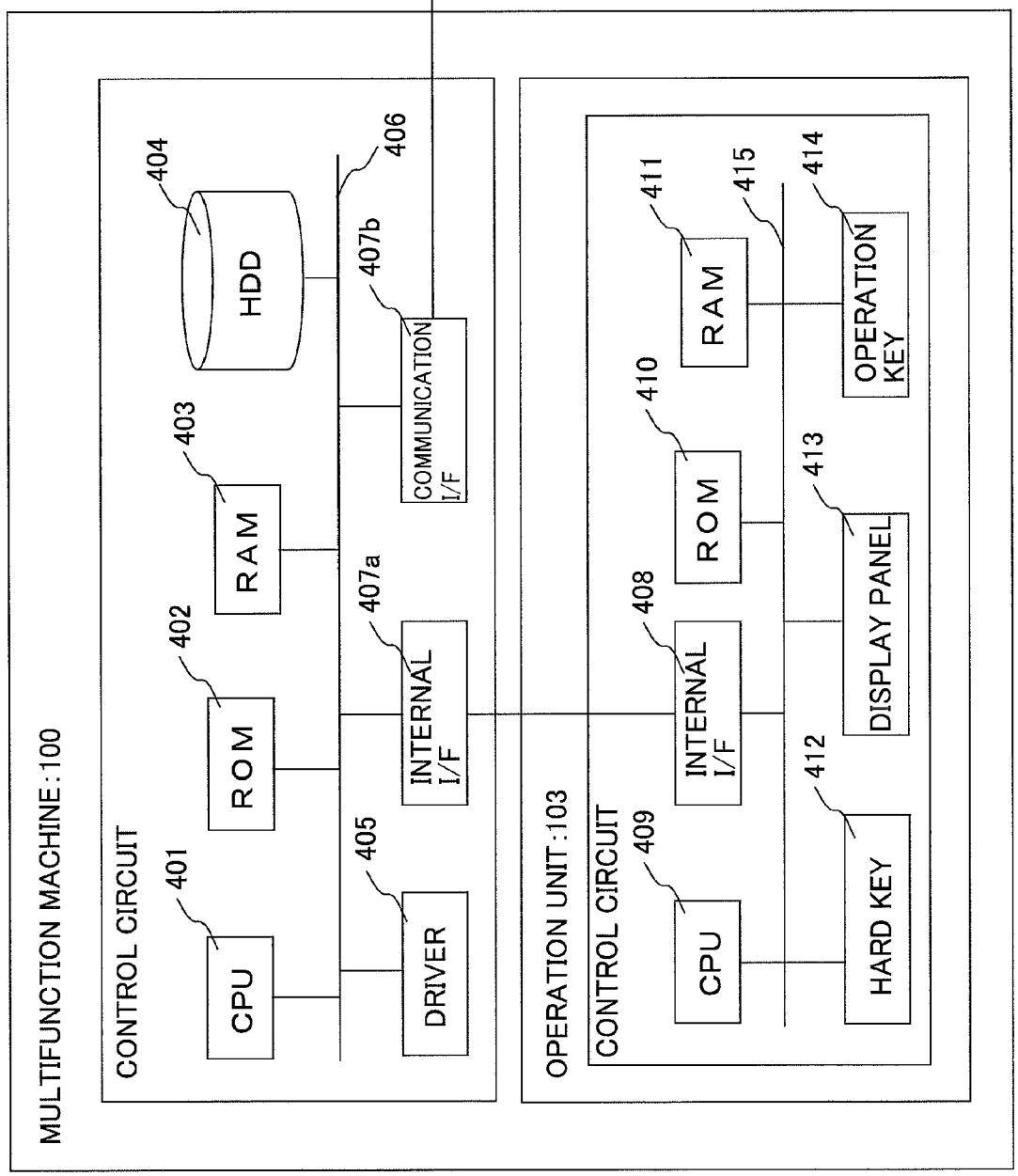
FIG. 4 is a diagram showing configurations of control system hardware for a multifunction machine and an operation unit according to an embodiment of the present disclosure.

Next, the configurations of control system hardware for the multifunction machine 100 and the operation unit 103 are described with reference to FIG. 4. FIG. 4 is a diagram showing configurations of control system hardware for the multifunction machine 100 and the operation unit 103 according to the present disclosure. However, the detail descriptions of each unit which is not related to the present disclosure directly are omitted.

A control circuit of the multifunction machine 100 is configured by connecting, through an internal bus 406, a CPU (Central Processing Unit) 401, ROM (Read Only Memory) 402, RAM (Random Access Memory) 403, a HDD (Hard Disk Drive) 404, and a driver 405 corresponding to each drive unit. The CPU 401 uses the RAM 403 as a work area, executes a program stored in the ROM 402, the HDD 404, or the like, gives and receives data or instructions from the driver 405 and the operation unit 103 based on the result from the execution, and controls the operations of each drive unit shown in FIG. 1. Furthermore, each unit described later (shown in FIG. 5) other than the drive units is embodied respectively by the CPU 401 executing a program.

In addition, an internal interface 407a is also connected to the internal bus 406 of the control circuit and the internal interface 407a connects a control circuit of the operation unit 103 and the like with a control circuit of the multifunction machine 100. The CPU 401 receives an instruction signal from the control circuit of the operation unit 103 and the like through the internal interface 407a and transmits an instruction signal, data, and the like to the control circuit of the operation unit 103 and the like.

Furthermore, the internal bus 406 of the control circuit is also connected to a communication interface 407b, and this communication interface 407b is connected with the network 120A via a communication cable. The network 120A is also connected to a terminal other than the multifunction machine 100. The CPU 401 transmits data (image data) to the terminal connected to the network 120A via the communication interface 407b and receives data from the terminal.

In addition, the control circuit of the operation unit 103 is configured by connecting, through an internal bus 415, a CPU 409, ROM 410, RAM 411, a hard key 412(301), a display panel 413(302), an operation key 414(303), and an internal interface 408. When the user operates the hard key 412 or the operation key 414, the CPU 409 transmits an instruction signal to the control circuit of the multifunction machine 100, based on the operation, through the internal interface 408. Furthermore, the functions of the CPU 409, ROM 410, and RAM 411 are the same as those described above, and each unit described later (shown in FIG. 5) is also embodied by the CPU 409 executing a program. The program and data that embody each unit described below are stored in the ROM 410.

EMBODIMENTS OF THE PRESENT DISCLOSURE

Figure 5:
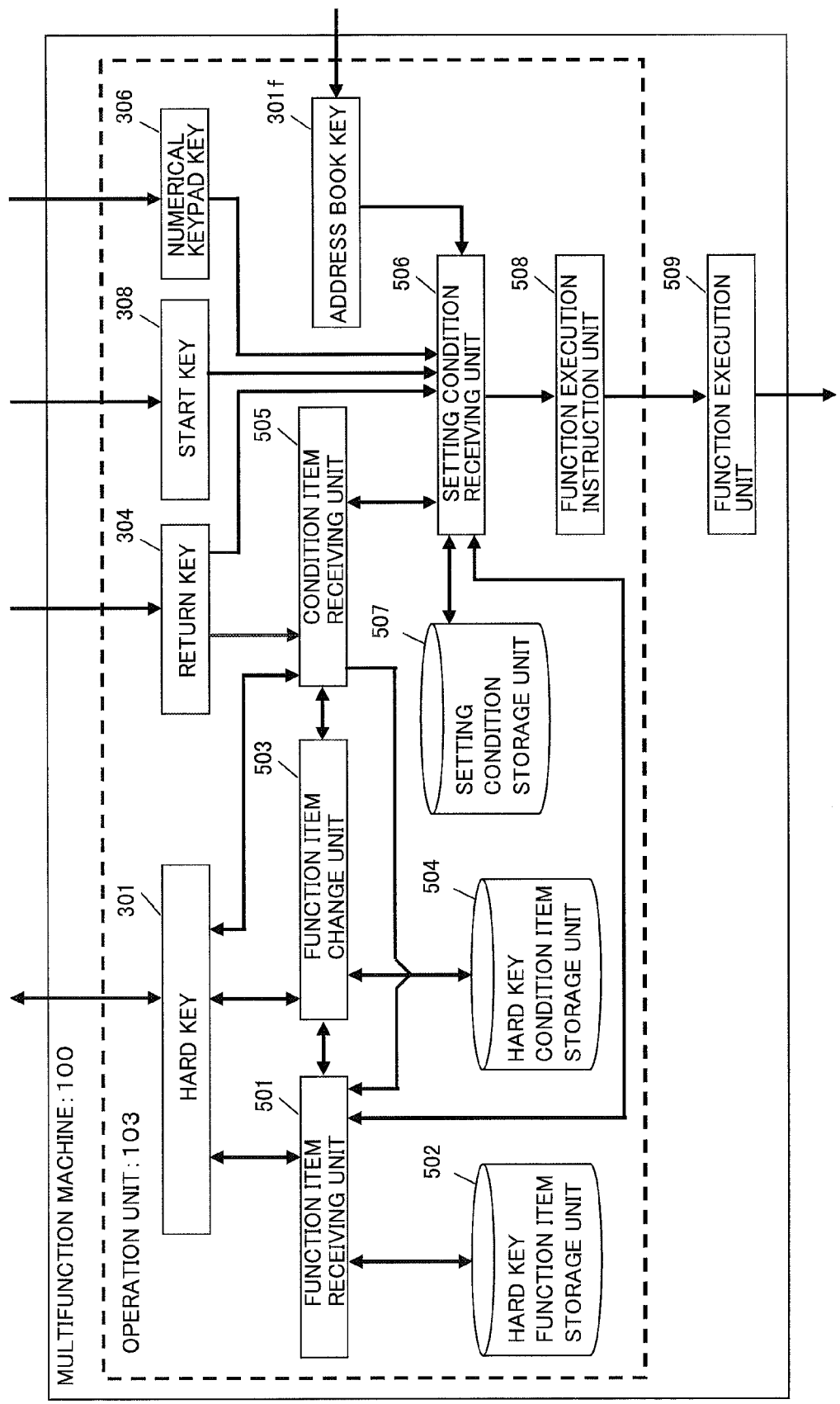
FIG. 5 is a functional block diagram of a multifunction machine and an operation unit of an embodiment of the present disclosure.
Figure 6:
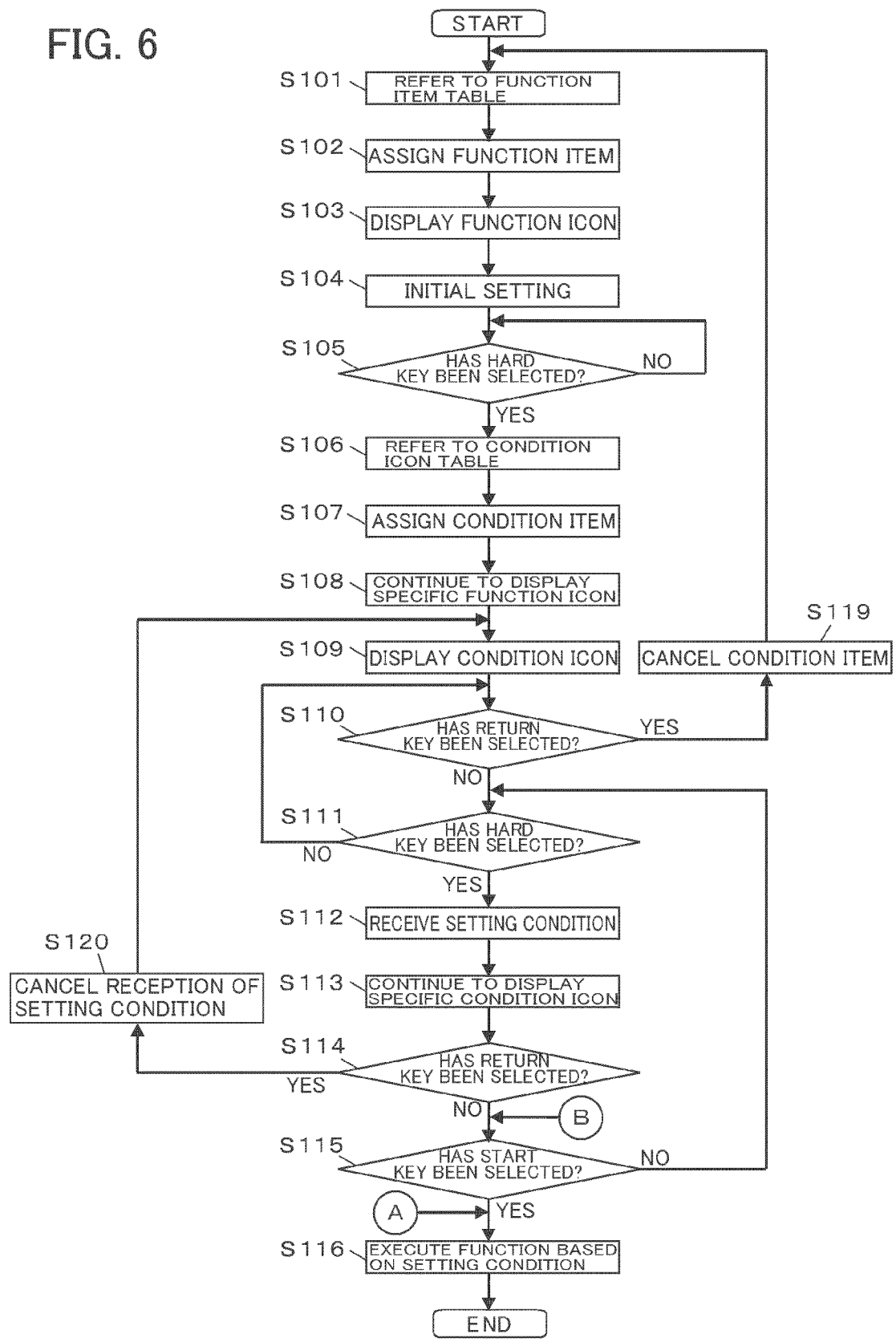
FIG. 6 is a first flow chart for showing an execution procedure according to an embodiment of the present disclosure.
Figure 7:
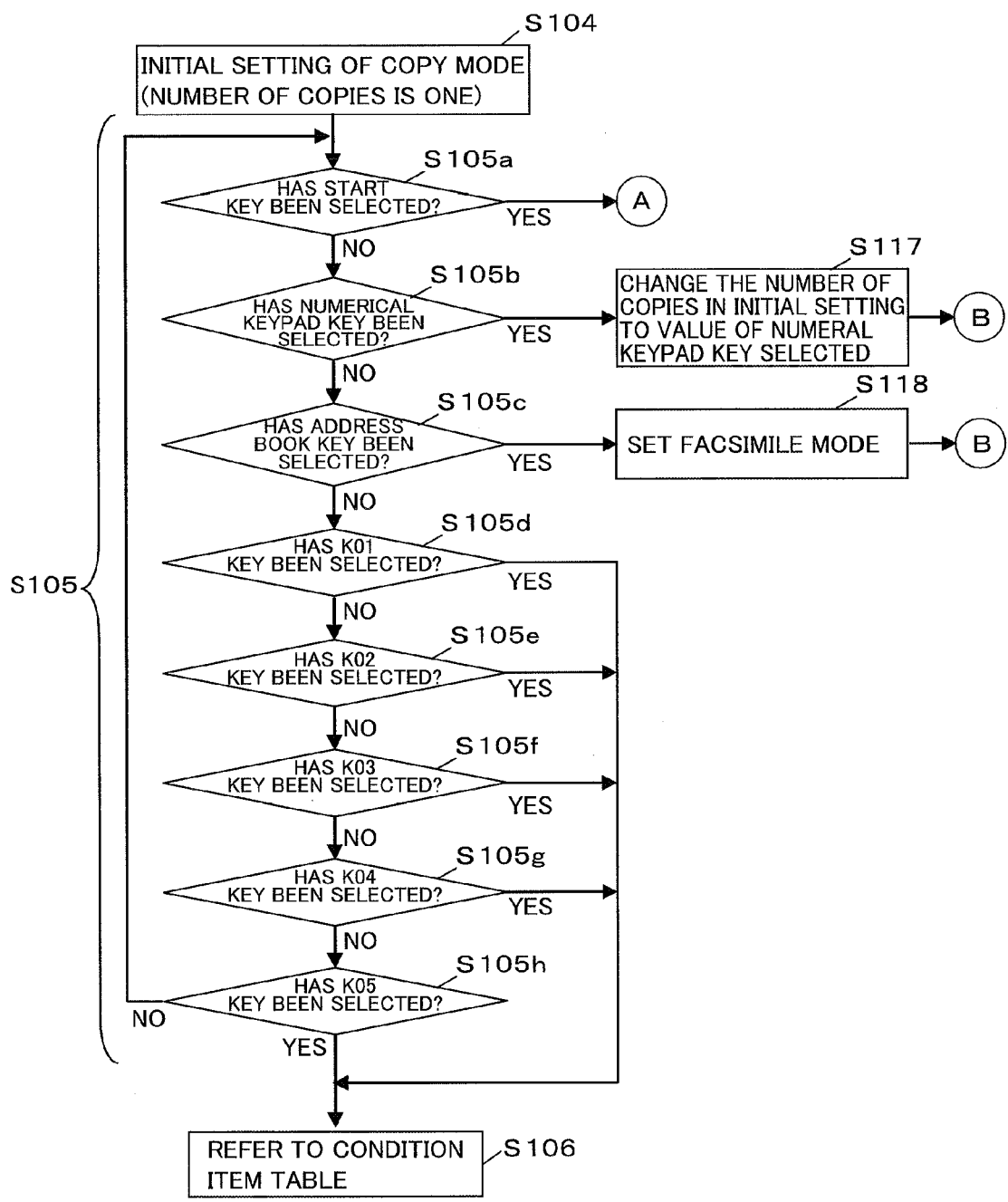
FIG. 7 is a second flow chart for showing an execution procedure according to an embodiment of the present disclosure.

Next, configurations and execution procedures according to the embodiment of the present disclosure are described with reference to FIGS. 5, 6, and 7. FIG. 5 is a functional block diagram of a multifunction machine and an operation unit of the present disclosure. FIG. 6 is a first flow chart for showing an execution procedure according to the present disclosure. FIG. 7 is a second flow chart for showing an execution procedure according to the present disclosure.

Initially, when a user powers up the multifunction machine 100, the operation unit 103 starts up along with the multifunction machine 100. Then, a function item receiving unit 501 of the operation unit 103 refers to a function item table that is stored in advance in a hard key function item storage unit 502 (FIG. 6: S101).

Figures 8A, 8B:
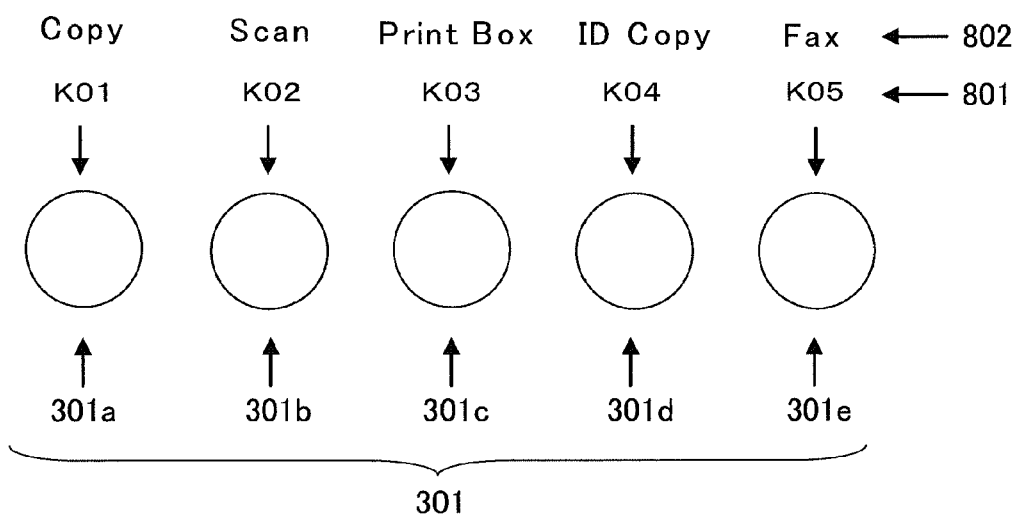
FIG. 8A is a diagram showing an example of a functional item table of an embodiment of the present disclosure.
FIG. 8B is a diagram showing a relationship between hard keys and hard key IDs according to an embodiment of the present disclosure.

As shown in FIG. 8A, hard key identification information 801 that identifies a predetermined number of hard keys 301 arranged in advance at the operation unit 103 (for example, "K01", "K02", and the like as a hard key ID) and a predetermined number of function items 802 that indicate a function that the multifunction machine 100 connected to the operation unit 103 can provide (for example, "Copy", "Scan", and the like) are associated and stored in the function item table 800.

Here, the hard key ID 801 indicates the order of hard keys (for example, a hard key disposed at the leftmost side) based on a specific hard key 301 disposed on the operation unit 103. For example, as shown in FIG. 8B, the order "K01" is assigned to the hard key 301a disposed at the leftmost side as a hard key ID on the operation unit 103 on which the five hard keys are arranged at predetermined intervals in the left-right direction. Furthermore, the order "K02" indicating the second is assigned to the hard key 301b that is disposed at the second position from the hard key 301a disposed at the leftmost side to the right direction, the order "K03" indicating the third is assigned to the hard key 301c which is disposed at the third position therefrom, the order "K04" indicating the fourth is assigned to the hard key 301d which is disposed at the fourth position therefrom, and the order "K05" indicating the fifth is assigned to the hard key 301e which is disposed at the fifth position therefrom, respectively. In this way, in the present embodiment, the order with a lower order is assigned to each hard key 301 sequentially from the specific hard key 301a disposed at the leftmost side in the right direction.

Furthermore, the function items 802 are items of functions that are frequently used by the user of the multifunction machine 100 and includes "Copy", "Scan", "Print Box", "ID Copy", and "Fax", for example. "Copy" is a function item that forms an image on a sheet placed on the document feeder tray 102, and "Scan" is a function item that reads the image of the document and stores it in a predetermined storage unit. Furthermore, "Print Box" is a function item that forms on a sheet an image that is stored in a predetermined storage unit in advance from a terminal via the network 120A, and "ID Copy" is a function item that reads images on front and back sides of a specific document (for example, an ID card and a driver license) to form the both images on a single sheet. Moreover, "Fax" is a function item that transmits an image of the document by facsimile to a predetermined destination facsimile.

In this way, the operation unit 103 (multifunction machine 100) is configured so as to suppress the number of hard keys from increasing pointlessly, by limiting the function item 802 to items of functions for which the use frequency by the user is high.

First, with reference to the function item table 800, the function item reception unit 501 acquires the hard key ID 801 and the function item 802 which is associated with the hard key ID 801 on the referenced function item table 800, and assigns the function item 802 thus acquired to a hard key corresponding to the hard key ID 801 thus acquired, respectively (FIG. 6: S102).

For example, as shown in FIG. 8B, the function item receiving unit 501 assigns "Copy" of the function item 802 corresponding to the hard key ID "K01" to the hard key 301a to which the hard key ID "K01" is assigned, and assigns "Scan" of the function item 802 corresponding to the hard key ID "K02" to the hard key 301b to which the hard key ID "K02" is assigned. Furthermore, the function item receiving unit 501 assigns "Print Box" of the function item 802 corresponding to the hard key ID "K03" to the hard key 301c to which the hard key ID "K03" is assigned, assigns "ID Copy" of the function item 802 corresponding to the hard key ID "K04" to the hard key 301d to which the hard key ID "K04" is assigned, and assigns "Fax" of the function item 802 corresponding to the hard key ID "K05" to the hard key 301e to which the hard key ID "K05" is assigned.

Then, the function item receiving unit 501 displays all or a portion of the predetermined number of function icons (all in the present embodiment) on the function icon display unit 901, as well as receiving the selection of a predetermined hard key.

More specifically, when the assignment of the function item 802 to the hard key 301 is complete, the function item receiving unit 501 displays each of the function icons indicating the function item 802 (function icon mimicking its function), respectively, in the proximity of each of the corresponding hard keys (FIG. 6: S103).

As shown in FIG. 9A, the function icon display unit 901 is configured to include an LED light (light emitting unit) and a light transmission unit (icon-shape hole portion, transparent member) that can transmit the light from the LED light and is formed in the shape of each function icon.

In the present embodiment, the function icon display unit 901 includes: icon-shape hole portions in which the shape of a function icon of a function item assigned to one of the hard keys 301a to 301e is formed by cutting in advance above and in the proximity of the hard key group 301; a predetermined transparent member disposed at the icon-shape hole portions thus formed by cutting; and a predetermined LED light that is disposed just below the transparent member (back side of the transparent member).

The function item receiving unit 501 transmits light from the transparent member corresponding to the shapes of the function icons 901a to 901e, by illuminating a predetermined number of LED lights corresponding to the function icons 901a to 901e, respectively. In this way, the function icons 901a to 901e are displayed above the hard keys 301a to 301e, respectively.

Then, since the operation unit 103 (multifunction machine 100) allows the user to visually recognize the function icons 901a to 901e, the operation unit 103 (multifunction machine 100) is configured such that the user can immediately understand the function items (functions) of the hard keys 301a to 301e arranged below and in the proximity of the function icon 901.

Moreover, as shown in FIG. 9A, since the operation unit 103 further arranges (displays) the character group 902 indicating function items of the function icon 901 ("Copy", "Scan", "Print Box", "ID Copy", "Fax", and the like as characters indicating function items) above and in the proximity of the function icons 901 in advance, the operation unit 103 is configured such that the user can understand the function items assigned to the hard key 301 reliably.

Moreover, when the function icons 901a to 901e are displayed, the function item receiving unit 501 displays a message that prompts the user to select the hard key 301 (for example, "Select the function") on the display panel 302 provided on the operation unit 103 in advance, as shown in FIG. 9A. In this way, the operation unit 103 (multifunction machine 100) prompts the user to select the hard key 301 to which the function items are assigned.

Then, when display of the function icons 901a to 901e and display of the message are complete, the function item receiving unit 501 notifies this completion to a setting condition receiving unit 506.

The setting condition receiving unit 506 that received the notification acquires initial setting conditions from memory for initial setting that stores the initial setting conditions of a copy function (copy mode) in advance, and causes the initial setting conditions thus acquired to be temporarily stored in the memory for setting conditions. In this way, the setting condition receiving unit 506 receives the initial setting conditions of the copy mode (FIGS. 6 and 7: S104).

Here, the initial setting conditions are setting conditions of "Normal Copy" as described later. The setting conditions of "Normal Copy" are set such that a predetermined value (for example, 600 dpi) is set as a resolution of an image, a predetermined value is set for an amount of toner per a single dot, and the number of copies is set as one, for example. The state in which the setting condition receiving unit 506 receives the initial setting conditions is equal to a state in which a copy function is executed based on the initial setting conditions when the user subsequently selects the start key 308.

Here, when the user selects the hard key 301a (hard key with the hard key ID "K01") corresponding to the function icon 901a of the predetermined function item 802 (for example, "Copy") without selecting the start key 308, the numerical keypad 306, or the Address Book key 301f (FIG. 7: S105a, NO→S105b, No→S105c, No) while the user looks at the function icons 901a to 901e displayed in the proximity of each of the hard keys 301 (FIG. 7: S105d, YES), the function item receiving unit 501 receives the selection of the hard key 301a and notifies this selection to a function item change unit 503.

The function item change unit 503 that received the notification changes the function items assigned to each of the hard keys 301 to the condition items indicating the setting conditions of the function item ("Copy") of the hard key 301a thus selected.

When a selection of a predetermined hard key is received by the function item reception unit 501, the function item change unit 503 changes the assignment to all or a portion of the predetermined number of hard keys from the function item to the condition item indicating the setting conditions of the function item assigned to the hard key for which the selection was received, respectively.

More specifically, the function item change unit 503 firstly refers to a condition item table 903 that is stored in a hard key condition item storage unit 504 in advance (FIGS. 6 and 7: S106).

As shown in FIG. 9B, a function item 904 (for example, "Copy" and the like), a hard key ID 905 (for example, "K01"

and the like), and a condition item 906 indicating the setting condition of the function item 904 (for example, "ECO Print Copy" and the like) are associated and stored in the condition item table 903.

Here, the condition items 906 are condition items of which setting condition are frequently inputted by the user among the condition items of the corresponding functions. The condition items included in the condition items 906 include "Normal Copy", "High Quality Copy", "ECO Print Copy", "2 in 1 Copy", "Duplex Copy", and the like, in a case of the function item 903 being "Copy". "Normal Copy" is an item of the initial setting conditions, and "High Quality Copy" is an item of setting conditions in which a resolution of an image is enhanced within a predetermined range among the initial setting conditions, for example. Furthermore, "ECO Print Copy" is an item of setting conditions in which an amount of the toner per a single dot is reduced within a predetermined range among the initial setting conditions, for example, and "2 in 1 Copy" is an item of setting conditions in which two images read sequentially are brought together into a single sheet. Moreover, "Duplex Copy" is an item of setting conditions in which two images read sequentially are printed on both sides of a single sheet.

In addition, it is arranged in advance so that the total amount (five) of the condition items 906 belonging to the specific function item 904 is set to be no more than the number (no more than five) of the hard keys 301. In this way, by limiting the condition item 906 to items of setting conditions for which the input frequency by the user is high, the operation unit 103 (multifunction machine 100) narrows options for the user so that the user is free from feeling unsure about how to input a setting condition, a result of which it becomes possible to allow the user to operate the keys simply as well as quickly. It should be noted that the abovementioned operation unit 103 (multifunction machine 100) is configured such that the user cannot input setting conditions other than the setting conditions corresponding to the abovementioned condition items 906, even if the user operated the hard key 301 or the operation keys 303.

Here, with reference to the condition item table 903, the function item change unit 503 retrieves a function item 904 of the hard key selected by the user from the condition table 903 thus referred to (the hard key for which the selection was received by the function item reception unit), and acquires a hard key ID 905 corresponding to the function item 904 thus retrieved and a condition item 906 associated with the hard key ID 905.

Next, the function item change unit 503 cancels the assignment of the function item 802 to the hard key 301, and assigns the condition item 906 thus acquired to the hard key 301 corresponding to the hard key ID 905 thus acquired (FIG. 6: S107).

For example, as shown in FIG. 10A, the function item change unit 503 assigns "Normal Copy" of the condition item 906 corresponding to the hard key ID "K01", in place of "Copy" of the function item 802 assigned previously, to the hard key 301*a* to which the hard key ID "K01" is assigned. Furthermore, the function item change unit 503 assigns "High Quality Copy" of the condition item 906 corresponding to the hard key ID "K02" to the hard key 301*b* of the hard key ID "K02", and assigns "ECO Print Copy" of the condition item 906 corresponding to the hard key ID "K03" to the hard key 301*c* of the hard key ID "K03", respectively, in place of the function items assigned previously. Moreover, the function item change unit 503 assigns "2 in 1 Copy" of the condition item 906 corresponding to the hard key ID "K04" to the hard key 301*d* of the hard key ID "K04", and assigns "Duplex Copy" of the condition item 906 corresponding to the hard key ID "K05" to the hard key 301*e* of the hard key ID "K05", respectively, in place of the function items assigned previously.

In this way, the operation unit 103 (multifunction 100) can assign two items (a function item and a condition item) to the hard key 301, depending on the user's selection of the hard key 301. Therefore, the user can input a predetermined setting condition by operating the hard key 301 only. As a result thereof, the operation unit 103 (multifunction machine 100) can allow the user to remember the key operations easily.

Here, if the contents assigned to the hard keys 301*a* to 301*e* are changed from the function item 802 to the condition item 906, the function item change unit 503 notifies the change to the condition item receiving unit 505.

The condition item receiving unit 505 continues to display a function icon corresponding to the hard key for which the selection was received by the function item receiving unit 501, and stops displaying another function icon.

More specifically, the condition item receiving unit 505 that received the notification continues to display a specific function icon corresponding to the hard key 301*a* selected by the user (received by the function item receiving unit 501), and displays a condition icon (for example, numbers or letters commonly available to the condition item 906 for each function item 802) indicating the condition item 906 in the proximity of the corresponding hard keys 301*a* to 301*e*, respectively, in a state stopping the display of other function icons.

More specifically, as shown in FIG. 10B, the condition item receiving unit 505 firstly maintains illumination of LED light corresponding to the specific function icon 901*a* (here, a function icon of "Copy") and turns off LED lights corresponding to another function icon (FIG. 6: S108). The operation unit 103 (the multifunction machine 100) can thereby allow the user to confirm a function item of the hard key 301 selected by the user.

In addition, as shown in FIG. 10B, the condition icon display unit 1002 is configured to include an LED light (light emitting unit), and a light transmission unit (an icon-shape pore portion, a transparent member) that can transmit the light from the LED light and is formed in the shape of each condition icon.

In the present embodiment, the condition icon display unit 1002 includes: icon-shape hole portions in which the shape of condition icons 1002*a* to 1002*e* of condition items assigned to one of the hard keys 301*a* to 301*e* are formed by cutting in advance on the hard key (in the proximity of an outer edge); a predetermined transparent member disposed at the icon-shape pore portion thus formed by cutting; and a predetermined LED light that is disposed just below the transparent member (back side of the transparent member).

Here, the LED lights corresponding to the condition icons 1002*a* to 1002*e* are different from the LED light of the abovementioned function icon 901. Then, the condition item receiving unit 505 transmits light from the transparent member corresponding to the shapes of the condition icons 1002*a* to 1002*e* by illuminating a predetermined number of LED lights of the condition icons 1002, respectively. In this way, the condition icons 1002 are displayed on the hard keys (inside) (FIG. 6: S109). Furthermore, the operation unit 103 (multifunction machine 100) can thereby allow the user to visually recognize the condition icon 1002 and recognize that the hard key 301 on which the condition icon 1002 is displayed can be selected again.

Furthermore, when the condition icon 1002 is displayed, as shown in FIG. 10B, the condition item receiving unit 505 displays a message that prompts the user to select the hard key 301 (for example, "Select the side menu.") on the display panel 302 of the operation unit 103. In this way, the user is prompted to select the hard key to which the condition item 906 (side menu) is assigned.

In addition, although a case in which the predetermined hard key 301a (the hard key of the hard key ID "K01") is selected (FIG. 7: S105d, Yes) has been explained in the foregoing, a case in which another hard key, for example, any one from among the hard key 301b of the hard key ID "K02" to the hard key 301e of the hard key ID "K05" is selected (FIG. 7: S105e, Yes; S105f, Yes; S105g, Yes; S105h, Yes) is also processed in the same way, except for the corresponding function item 802 and the corresponding condition item 906 differing. Therefore, an explanation thereof will be omitted.

When the assignments to all or a portion of the predetermined number of hard keys 301a to 301e is changed from the function item to the condition item by the function item change unit 503, the condition item receiving unit 505 displays a condition icon corresponding to the condition item assigned to the hard key on the condition icon display unit 1002, and receives a selection of a predetermined hard key.

More specifically, when the user selects the hard key 301c corresponding to a specific condition icon 1002c (number "3") without selecting the return key 304 (FIG. 6: S110, No), with a specific function icon 902 corresponding to the specific function icon ("Copy") being displayed, while the user looks at the condition icon 1002 displayed in the proximity of each hard key 301, the condition item receiving unit 505 receives the selection of the hard key 301c and notifies of the selection to the setting condition receiving unit 506 (FIG. 6: S111, Yes).

The setting condition receiving unit 506 that received the notification receives setting conditions of the specific condition item corresponding to the hard key 301c thus selected (for example, "ECO Print Copy").

More specifically, when a selection of a predetermined hard key on which a condition item corresponding thereto is displayed is received by the condition item receiving unit 505, the setting condition receiving unit 506 receives the setting conditions indicated by the condition item corresponding to the hard key for which the selection was received.

More specifically, the setting condition receiving unit 506 acquires a specific condition item 906 ("ECO Print Copy") corresponding to the hard key 301c thus selected, and refers to the setting condition table that is stored in the setting condition storage unit 507 in advance. The condition item and the specific setting conditions of the condition item are associated and stored in the setting condition table. The setting condition receiving unit 506 acquires specific setting conditions corresponding to the specific condition item 906 from the setting condition table thus referred to, and changes (rewrites) the contents stored in the memory for setting conditions from initial setting conditions to the setting conditions thus acquired. In this way, the setting condition receiving unit 506 receives setting conditions of the specific condition item (FIG. 6: S112).

Here, the state in which the setting condition receiving unit 506 receives the setting conditions is equal to a state in which a predetermined function is executed based on the setting conditions when the user subsequently selects the start key 308. In this way, the user can input setting conditions of a function that the user wants to operate by way of selecting the hard key 301 twice. Here, the setting conditions of the abovementioned condition item "ECO Print Copy" are inputted by way of a plurality of key operations (for example, three) when using a conventional operation panel; whereas, in the present disclosure, the same setting condition can be inputted by selecting the hard key 301 twice, since the present disclosure limits the number of the condition items 906 belonging to the specific function item "Copy". As a result thereof, the operation unit 103 (multifunction machine 100) facilitates the key operation thereof for the user, a result of which the user can input setting conditions of a function that the user wants to operate quickly.

When the selection of a predetermined hard key on which a condition icon corresponding thereto is displayed is received by the condition item receiving unit 505, the setting condition receiving unit 506 continues to display the condition item corresponding to the hard key for which the selection was received, and stops displaying other condition icons. As shown in FIG. 11A, the setting condition receiving unit 506 maintains illumination of LED light corresponding to the specific condition icon 1002c of the hard key thus selected, and turns off LED lights corresponding to other condition icons so that the setting condition receiving unit 506 continues to display the specific condition icon and stops displaying other condition icons (FIG. 6: S113). In this way, the operation unit 103 (multifunction machine 100) can allow the user to confirm that the user selected a specific hard key 301.

Here, the display panel 302 is configured to enable displaying contents of a condition item and/or setting conditions corresponding to a condition item.

Then, when the selection of a predetermined hard key on which a condition icon corresponding thereto is displayed is received by the condition item receiving unit 505, the setting condition receiving unit 506 displays the contents of the condition item corresponding to the hard key for which the selection is received and/or setting conditions corresponding to the condition item on the display panel 302.

More specifically, as shown in FIG. 11A, the setting condition receiving unit 506 displays a message indicating setting conditions of the specific condition item (for example, "Ready to Copy 3. ECO Print Copy") on the display panel 302 of the operation unit 103. In this way, the operation unit 103 (multifunction machine 100) can allow the user to confirm the setting conditions inputted reliably.

Here, when the user selects the start key 308 without selecting the return key 304 (FIG. 6: S114, No), with the specific function icon (the function icon 901A in FIG. 11A) and the specific condition icon (the condition icon 1002c in FIG. 11A) being displayed, i.e. with the setting conditions of the specific condition item 906 being received, the setting condition receiving unit 506 receives the selection of the start key 308, transmits the specific setting conditions stored in the memory for setting conditions to a function execution instruction unit 508, and notifies of the selection to the function execution instruction unit 508 (FIG. 6: S115, Yes).

The function execution instruction unit 508 that received the notification instructs a function execution unit 509 of the multifunction machine 100 to execute a specific function based on the specific conditions thus received.

The function execution unit 509 that received the instruction executes the specific function based on the specific setting conditions (FIG. 6: S116). In the foregoing, a copy function based on the setting conditions of "ECO Print Copy" is executed. In this way, the user can cause the multifunction machine 100 to execute a function that the user wants to operate.

Incidentally, when the user selects the start key 308 (FIG. 7: S105a, Yes) without selecting the predetermined hard key 301 (FIG. 7: S105d, No→S105e, No→S105f, No→S105g, No→S105h, No) in S105, the setting condition receiving unit 506 receives the selection of the start key 308, transmits the initial setting conditions stored in the memory for the setting conditions according to the initial settings (FIG. 7: S104) to the function execution instruction unit 508, and notifies of the selection to the function execution instruction unit 508.

The function execution instruction unit 508 that received the notification instructs the function execution unit 509 of the multifunction machine 100 to execute a copy function based on the initial setting conditions thus received, and the function execution unit 509 executes the copy function based on the initial setting conditions (FIG. 6: S116).

In this way, the user can cause the multifunction machine 100 to execute a normal copy function quickly based on the initial setting conditions by way of selecting the start key 308 once.

Furthermore, when the user selects a specific numerical keypad key 306 (for example, the "3" key, 306*a*) (FIG. 7: S105*b*, Yes) in S105, the setting condition receiving unit 506 receives the selection of the specific numerical keypad key 306, and changes, in the initial setting conditions, the number of copies from one to the value of the specific numeral keypad key 306 thus selected (for example, three) (FIG. 7: S117). When the user subsequently selects the start key 308 (FIG. 6: S115, Yes), the setting condition receiving unit 506 receives the selection of the start key 308, and transmits the setting conditions in which the number of copies has been changed to a predetermined value (three) to the function execution instruction unit 508. The function execution instruction unit 508 instructs the function execution unit 509 to execute a copy function based on the setting conditions thus received (the number of copies is three), and the function execution unit 509 executes a copy function based on the setting conditions (FIG. 6: S116). In this way, the user can change the number of copies easily and cause the multifunction machine 100 to execute a normal copy function.

Furthermore, when the user selects the Address Book key 301*f* (FIG. 7: S105*c*, Yes) in S105, the setting condition receiving unit 506 receives the selection of the Address Book key 301*f*, and changes from a copy function (copy mode) corresponding to the initial setting conditions to a facsimile function (fax mode). In addition, the setting condition receiving unit 506 acquires facsimile destination information from memory for an address book in which information regarding a plurality of facsimile destination (for example, facsimile numbers) is stored in advance, and displays a facsimile destination thus acquired on the display panel 302. In this way, the facsimile function is selected (FIG. 7: S118). Then, when the user selects a predetermined facsimile destination among the facsimile destinations displayed on the display panel 302 and selects the start key 308 (FIG. 6: S115, Yes), the setting condition receiving unit 506 receives the selection of the start key 308 and transmits the facsimile destination information thus selected to the function execution instruction unit 508. The function execution instruction unit 508 instructs the function execution unit 509 to execute the facsimile function based on the facsimile destination information, and the function execution unit 509 executes the facsimile function based on the facsimile destination information (FIG. 6: S116). In this way, the user can cause the multifunction machine 100 to execute a facsimile function quickly using facsimile destination information stored in advance.

Furthermore, when the user selects the return key 304 in S110, with a specific function icon being displayed, the condition item receiving unit 505 receives the selection of the return key 304 (FIG. 6: S110, Yes), and notifies of the selection to the function item receiving unit 501. The function item receiving unit 501 that received the notification cancels the condition item 906 assigned to the hard key 301 (FIG. 6: S119), refers to the function item table 800 (FIG. 6: S101), and assigns the function item 802 of the function item table 800 to the hard key 301 corresponding to the hard key ID 801 of the function item table 800 (FIG. 6: S102). In this way, even if the user mistakenly selects the hard key 301, the operation unit 103 (multifunction machine 100) allows the user to select a new hard key 301 again so that the user can select the appropriate function item. It should be noted that subsequent processing is the same as the foregoing and thus omitted.

Furthermore, when the user selects the return key 304 in S114, with the setting conditions of the specific condition item being received, the setting condition receiving unit 506 receives the selection of the return key 304 (FIG. 6: S114, Yes), cancels the reception of the specific setting conditions by deleting the specific setting conditions temporarily stored in the memory for setting conditions (FIG. 6: S120), and notifies of the cancellation to the condition item receiving unit 505. The condition item receiving unit 505 that received the notification maintains illumination of a specific condition icon and resumes illuminations of other condition icons to display a predetermined number of the condition icons 1002*a* to 1002*e* in the proximity of the corresponding hard key 301 (FIG. 6: S109). In this way, even if the user mistakenly selects the hard key 301 and inputs predetermined setting conditions once, the operation unit 103 (multifunction machine 100) can allow the user to input the appropriate setting conditions by selecting a new hard key 301 again. It should be noted that subsequent processing is the same as the foregoing and thus omitted.

Furthermore, when the user selects the hard key 301*b* corresponding to another condition icon (for example, the number "2") without selecting the start key 308 (FIG. 6: S115, No), with setting conditions of the specific condition item being received, the condition item receiving unit 505 receives the selection of the hard key 301*b*, and notifies of the selection to the setting condition receiving unit 506 (FIG. 6: S111, Yes). The setting condition receiving unit 506 that receives the notification temporarily stores the setting conditions of the condition item 906 corresponding to the hard key 301*b* thus selected (for example, "High Quality Copy") in the memory for setting conditions, and receives the setting conditions (FIG. 6: S112).

Furthermore, as shown in FIG. 11B, the setting condition receiving unit 506 illuminates the LED light corresponding to the specific condition icon 1002*b* (in the foregoing, the number "2") of the hard key 301*b* thus selected, turns off the LED light corresponding to the other condition icon 1002*c* (in the foregoing, the number "3"), continues to display the condition icon 1002*b* (the number "2") of the hard key 301*b* thus newly selected, and stops displaying other condition icons (the number "3") (FIG. 6: S113). Furthermore, as shown in FIG. 11B, the setting condition receiving unit 506 displays a message indicating setting conditions of the specific condition item thus selected again (for example, "Ready to Copy 2. High Quality Copy") on the display panel 302 of the operation unit 103. In this way, when the user selects various hard keys 301 and confirms the selections on the display panel 302, with a specific function item being selected, the user can confirm the condition item 906 assigned to the hard key 301. In this way, the operation unit 103 (multifunction machine 100) is configured to allow the user to properly find a condition item 906 that the user wants to operate. It should be noted that subsequent processing is the same as the foregoing and thus omitted.

In this way, with such an operation unit (multifunction machine), since the user can input setting conditions of a specific function by simply selecting the hard key twice, the user can input setting conditions of a function that the user wants to operate simply and quickly without feeling unsure about key operations.

Furthermore, since the operation unit (multifunction machine) assigns two items (a function item and a condition item) to the hard key, depending on the selection of the hard key by the user, it is unnecessary for the user to remember on which lower layer the setting conditions of a specific function exist, as in a conventional operation panel. The present operation unit (multifunction machine) allows the user to remember key operation easily, a result of which the operability of hard keys for the user is improved. Furthermore, since it is unnecessary for the present operation unit (multifunction machine) to use a large display panel, space savings is possible.

In addition, the present disclosure includes: a predetermined number of hard keys to which a function item indicating a predetermined function is respectively assigned;

a function icon display unit that can display a predetermined number of function icons indicating the function item respectively assigned to the predetermined number of hard keys, in the proximity of each of the predetermined number of hard keys;

a condition icon display unit that can display a condition icon indicating a condition item respectively assigned to the predetermined number of hard keys, at or in the proximity of each of the predetermined number of hard keys;

the method comprising:

a function item receiving step that displays all or a portion of the predetermined number of function icons on the function icon display unit, and receives a selection of a predetermined hard key;

a function item change step that changes an assignment to all or a portion of the predetermined number of hard keys from the function item to the condition item indicating a setting condition of the function item assigned to the hard key for which a selection is received, respectively, when the selection of the predetermined hard key is received by the function item receiving unit;

a condition item receiving step that displays a condition icon corresponding to the condition item assigned to the hard key on the condition icon display unit and receives a selection of a predetermined hard key, when an assignment to all or a portion of the predetermined number of hard keys is changed from the function item to the condition item by the function item change unit; and a setting condition receiving step that receives a setting condition indicated by the condition item corresponding to the hard key for which the selection was received, when a selection of a predetermined hard key on which a condition icon corresponding thereto is displayed is received by the condition item receiving unit.

The present operation method can also obtain the same effects as those described above.

In addition, the present disclosure can be provided as a program for execution in a computer that is distributed individually via electric communication lines. In this case, a central processing unit (CPU) realizes control operation by cooperating with each circuit other than the CPU in accordance with the program of the present disclosure. In addition, each unit that is realized using the program and CPU can also be configured using dedicated hardware. In addition, the program can be distributed in a form recorded in a computer-readable storage such as CD-ROM.

In addition, although it is configured in the embodiment of the present disclosure so that the function item receiving unit 501 illuminates the LED light corresponding to the function icon 901 and the condition item receiving unit 505 illuminates the LED light corresponding to the condition icon 1002, it may be configured so that the function item receiving unit 501 and the condition item receiving unit 505 flash the respective LED lights in a predetermined cycle.

Figure 12:
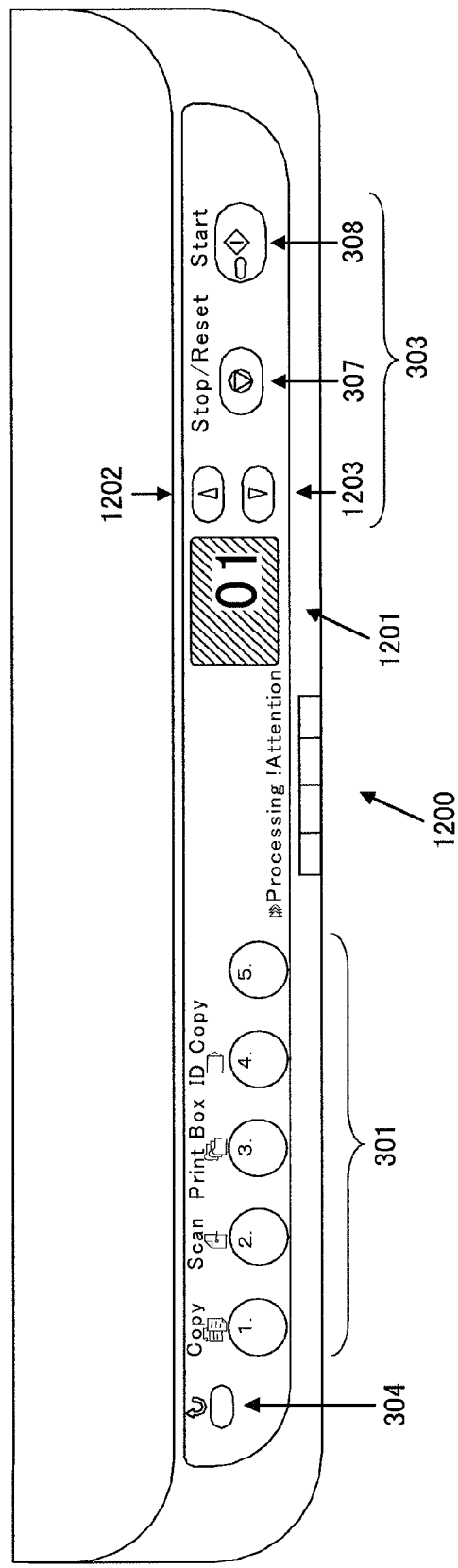
FIG. 12 is a conceptual diagram showing an overall configuration of an operation unit according to another embodiment of the present disclosure.

In addition, although it is configured in the embodiment of the present disclosure so that the display panel displaying the abovementioned messages is provided on the operation unit 103 in addition to a predetermined number of hard keys as shown in FIG. 3, it may be configured so that the display panel is not provided. For example, as shown in FIG. 12, the operation unit 1200 of another embodiment of the present disclosure is provided with the abovementioned predetermined number of hard keys 301, a document number display panel 1201 for displaying only the number of documents, and a predetermined number of the operation keys 303. The operation keys 303 include the return key 304, an up key 1202, a down key 1203, a Stop/Reset key 307, and a Start key 308. With such a configuration, although an auxiliary message cannot be displayed on the abovementioned display panel, it can simplify the configuration of the operation unit 1200, a result of which it becomes possible to save space by eliminating the operation keys 303 and eliminating the display panel. Furthermore, in a case in which it is still difficult to find a function item or a condition item assigned to the hard key 301, a label or a seal on which the function item or the condition item is described may be prepared individually, and the label or seal on which the function item or the condition item assigned to the hard key 301 is described may be affixed below and in the proximity of the hard key 301 of the abovementioned operation unit 1200. In addition, it may be configured so that a label on which the function item or the condition item is described can be printed on a predetermined sheet by the multifunction machine 100.

Moreover, although it is configured so that the predetermined function icon 901 and the predetermined condition icon 1002 is displayed or not displayed (turned off) by performing predetermined cutting on the hard key 301, disposing a transparent member thereon, and providing an LED light in the embodiment of the present disclosure, another configuration may be employed. For example, it may be configured such that a display panel for icons on which the abovementioned function icon 901 or condition icon 1002 can be displayed or not displayed (turned off) is provided on the hard key 301 so as to display or not display (turn off) the function icon 901 or the condition icon 1002 through the display panel for icons.

In addition, although the configuration is described in which the copy function corresponding to the initial setting conditions is changed to the facsimile function (FIG. 7: S118) when the user selects the Address Book key 301*f* shown in FIG. 3 (FIG. 7, S105*c*, Yes) in the embodiment of the present disclosure, in a case of being another key such as the Address Recall/Pause key 301*g* or the On Hook key 301*h*, the operations thereof are as follows.

When the user selects the Address Recall/Pause key 301*g* shown in FIG. 3 in S105, the setting condition receiving unit 506 changes from the copy function (copy mode) corresponding to the initial setting conditions to the facsimile function (fax function), acquires facsimile destination information inputted previously, and displays the destination on the display panel 302. When the user subsequently selects the start key 308, the facsimile destination information is transmitted to the function execution unit 509 similarly to as described above, and the function execution unit 509 executes the facsimile function.

Furthermore, when the user selects the On Hook key 301h shown in FIG. 3 in S105, the setting condition receiving unit 506 changes from the copy function (copy mode) corresponding to the initial setting conditions to the facsimile function (fax function), and enters a state in which a line is connected to the network 120A. Then, in accordance with the selection (input) of the user to the numerical keypad key 306 and the selection of the start key 308, the function execution unit 509 executes the facsimile function, similarly to as described above.

In addition, although it is configured so that a specific function item table 800 is stored in advance in the hard key function item storage unit 502 and a specific condition item table 903 is stored in advance in the hard key condition item storage unit 504 in the embodiment of the present disclosure, it may be configured so that the function items 802 of the function item table 800 or the condition items 906 of the condition item table 903 can be set and modified as appropriate by a user such as an administrator.

Furthermore, although the operation unit 103 according to the embodiments of the present disclosure is employed in relation to the copy function of the multifunction machine 100, it may be employed for a scanning function, a print box function, an ID copy function, a facsimile function, and the like, for example. Moreover, although a case in which the operation unit 103 is applied to the multifunction machine 100 is described in the embodiment of the present disclosure, the same operational effect can be exerted when applying to various image forming apparatuses, various image processing devices, various image editing devices, various image display devices, and the like, including the operation unit 103 (operation device).

Furthermore, although it is configured so that the operation unit 103 includes each unit in the embodiment of the present disclosure, it may be configured so that a program for realizing each unit is stored in a storage medium, and this storage medium is provided. With such a configuration, the program is read by the operation unit 103 or the multifunction machine 100 to realize each unit by the operation unit 103 or the multifunction machine 100. In this case, the program itself read from the storage medium exerts the operational effects of the present disclosure. Furthermore, it is possible to provide as a method storing steps executed by each unit in a hard disk.

The invention claimed is:

1. An operation device comprising:
    a predetermined number of hard keys to which a function item indicating a predetermined function is respectively assigned;
    a function icon display unit that can display a predetermined number of function icons indicating the function item respectively assigned to the predetermined number of hard keys, in proximity of each of the predetermined number of hard keys;
    a condition icon display unit that can display a condition icon indicating a condition item respectively assigned to the predetermined number of hard keys, at each of the predetermined number of hard keys or in the proximity of each of the predetermined number of hard keys;
    a function item receiving unit that displays all or a portion of the predetermined number of function icons on the function icon display unit, and receives a first selection of a hard key;
    a function item change unit that changes an assignment to all or a portion of the predetermined number of hard keys from the function item to the condition item indicating a setting condition of the function item assigned to the hard key of the first selection, respectively, when the first selection of the hard key has been received by the function item receiving unit;
    a condition item receiving unit that displays a condition icon corresponding to the condition item assigned to the hard key of the first selection on the condition icon display unit and receives a second selection of a hard key, when the assignment to all or a portion of the predetermined number of hard keys is changed from the function item to the condition item by the function item change unit; and
    a setting condition receiving unit that receives a setting condition indicated by the condition item corresponding to the hard key of the second selection, when the second selection of the hard key on which a condition icon corresponding thereto is displayed has been received by the condition item receiving unit.

2. The operation device according to claim 1, wherein the condition item receiving unit is configured to cause the function item receiving unit to continue to display a function icon corresponding to the hard key for which the first selection is received by the function item receiving unit, and to stop displaying another function icon.

3. The operation device according to claim 1, wherein, when the second selection of the hard key on which the condition icon corresponding to the hard key is displayed has been received by the condition item receiving unit, the setting condition receiving unit is configured to cause the condition item receiving unit to continue to display the condition icon, and to stop displaying another condition icon.

4. The operation device according to claim 1, further comprising a display panel unit that can display contents of a condition item and/or a setting condition corresponding to a condition item,
    wherein, when the second selection of the hard key on which the condition icon corresponding to the hard key is displayed has been received by the condition item receiving unit, the setting condition receiving unit causes the display panel unit to display the contents of the condition item corresponding to the hard key and/or the setting condition corresponding to the condition item.

5. The operation device according to claim 1, wherein the function icon and/or the condition icon comprises a light emitting unit and a light transmission unit that can transmit light from the light emitting unit and is formed in a shape of each icon.

6. The operation device according to claim 1, wherein the function item is an item of a function having a high frequency of use by a user of an image forming apparatus, and
    wherein the condition item is a condition item having a high frequency of input by a user, among condition items of corresponding functions.

7. An image forming apparatus having an operation device comprising:
    a predetermined number of hard keys to which a function item indicating a predetermined function is respectively assigned;
    a function icon display unit that can display a predetermined number of function icons indicating the function item respectively assigned to the predetermined number of hard keys, in a proximity of each of the predetermined number of hard keys;
    a condition icon display unit that can display a condition icon indicating a condition item respectively assigned to the predetermined number of hard keys, at each of the predetermined number of hard keys or in the proximity of each of the predetermined number of hard keys;
a function item receiving unit that displays all or a portion of the predetermined number of function icons on the function icon display unit, and receives a first selection of a hard key;
a function item change unit that changes an assignment to all or a portion of the predetermined number of hard keys from the function item to the condition item indicating a setting condition of the function item assigned to the hard key of the first selection, respectively, when the first selection of the hard key has been received by the function item receiving unit;
a condition item receiving unit that displays a condition icon corresponding to the condition item assigned to the hard key of the first selection on the condition icon display unit and receives a second selection of a hard key, when the assignment to all or a portion of the predetermined number of hard keys is changed from the function item to the condition item by the function item change unit; and
a setting condition receiving unit that receives a setting condition indicated by the condition item corresponding to the hard key of the second selection, when the second selection of the hard key on which a condition icon corresponding thereto is displayed has been received by the condition item receiving unit.

8. The image forming apparatus according to claim 7, wherein
the condition item receiving unit is configured to cause the function item receiving unit to continue to display a function icon corresponding to the hard key for which the first selection is received by the function item receiving unit, and to stop displaying another function icon.

9. The image forming apparatus according to claim 7, wherein
when the second selection of the hard key on which the condition icon corresponding to the hard key is displayed has been received by the condition item receiving unit, the setting condition receiving unit is configured to cause the condition item receiving unit to continue to display the condition icon, and to stop displaying another condition icon.

10. The image forming apparatus according to claim 7, further comprising a display panel unit that can display contents of a condition item and/or a setting condition corresponding to a condition item,
wherein, when the second selection of the hard key on which the condition icon corresponding to the hard key is displayed has been received by the condition item receiving unit, the setting condition receiving unit causes the display panel unit to display the contents of the condition item corresponding to the hard key and/or the setting condition corresponding to the condition item.

11. The image forming apparatus according to claim 7, wherein the function icon and/or the condition icon comprises a light emitting unit and a light transmission unit that can transmit light from the light emitting unit and is formed in a shape of each icon.

12. The image forming apparatus according to claim 7, wherein the function item is an item of a function having a high frequency of use by a user of an image forming apparatus, and
wherein the condition item is a condition item having a high frequency of input by a user, among condition items of corresponding functions.

13. An operation method of an operation device, wherein the operation device includes:
a predetermined number of hard keys to which a function item indicating a predetermined function is respectively assigned;
a function icon display unit that can display a predetermined number of function icons indicating the function item respectively assigned to the predetermined number of hard keys, in a proximity of each of the predetermined number of hard keys;
a condition icon display unit that can display a condition icon indicating a condition item respectively assigned to the predetermined number of hard keys, at each of the predetermined number of hard keys or in the proximity of each of the predetermined number of hard keys;
the method comprising:
a function item receiving step that displays all or a portion of the predetermined number of function icons on the function icon display unit, and receives a first selection of a hard key;
a function item change step that changes an assignment to all or a portion of the predetermined number of hard keys from the function item to the condition item indicating a setting condition of the function item assigned to the hard key of the first selection, respectively, when the first selection of the hard key has been received by the function item receiving unit;
a condition item receiving step that displays a condition icon corresponding to the condition item assigned to the hard key of the first selection on the condition icon display unit and receives a second selection of a hard key, when the assignment to all or a portion of the predetermined number of hard keys is changed from the function item to the condition item by the function item change unit; and
a setting condition receiving step that receives a setting condition indicated by the condition item corresponding to the hard key of the second selection, when the second selection of the hard key on which a condition icon corresponding thereto is displayed has been received by the condition item receiving unit.

* * * * *